US010108349B2

(12) United States Patent
Marinescu et al.

(10) Patent No.: US 10,108,349 B2
(45) Date of Patent: Oct. 23, 2018

(54) METHOD AND SYSTEM THAT INCREASE STORAGE-STACK THROUGHPUT

(71) Applicant: VMware, Inc., Palo Alto, CA (US)

(72) Inventors: Adrian Marinescu, Bellevue, WA (US); Thorbjoern Donbaek, Naerum (DK)

(73) Assignee: VMware, Inc., Palo Alto, CA (US)

( * ) Notice: Subject to any disclaimer, the term of this patent is extended or adjusted under 35 U.S.C. 154(b) by 60 days.

(21) Appl. No.: 15/174,631

(22) Filed: Jun. 6, 2016

(65) Prior Publication Data

US 2017/0351437 A1   Dec. 7, 2017

(51) Int. Cl.
*G06F 12/00* (2006.01)
*G06F 3/06* (2006.01)
*G06F 9/455* (2018.01)

(52) U.S. Cl.
CPC .......... *G06F 3/0611* (2013.01); *G06F 3/0613* (2013.01); *G06F 3/0635* (2013.01); *G06F 3/0685* (2013.01); *G06F 9/45533* (2013.01); *G06F 9/45545* (2013.01)

(58) Field of Classification Search
CPC .... G06F 3/0611; G06F 3/0613; G06F 3/0635; G06F 3/0685; G06F 9/45533; G06F 3/45545
See application file for complete search history.

(56) References Cited

U.S. PATENT DOCUMENTS 9,032,399 B1 *  5/2015  Yang ............... G06F 9/45558
                                                    718/1
2007/0094669 A1   4/2007  Rector et al.

* cited by examiner

*Primary Examiner* — Shawn X Gu

(57) ABSTRACT

The current document is directed to a storage stack subsystem of a computer system that transfers data between memory and various data-storage devices and subsystems and that processes I/O requests. In one implementation, the disclosed storage stack includes a latency monitor, an I/O-scheduling bypass pathway, and short-circuit switch, controlled by the latency monitor. While the latency associated with I/O-request execution remains below a threshold latency, I/O-scheduling components of the storage stack are bypassed, with I/O requests routed directly to multiple input queues associated with one or more high-throughput multi-queue I/O device controllers. When the latency for execution of I/O requests rises above the threshold latency, I/O requests are instead directed to I/O-scheduling components of the storage stack, which attempt to optimally reorganize the incoming I/O-request stream and optimally distribute I/O-requests among multiple input queues associated I/O device controllers.

20 Claims, 41 Drawing Sheets

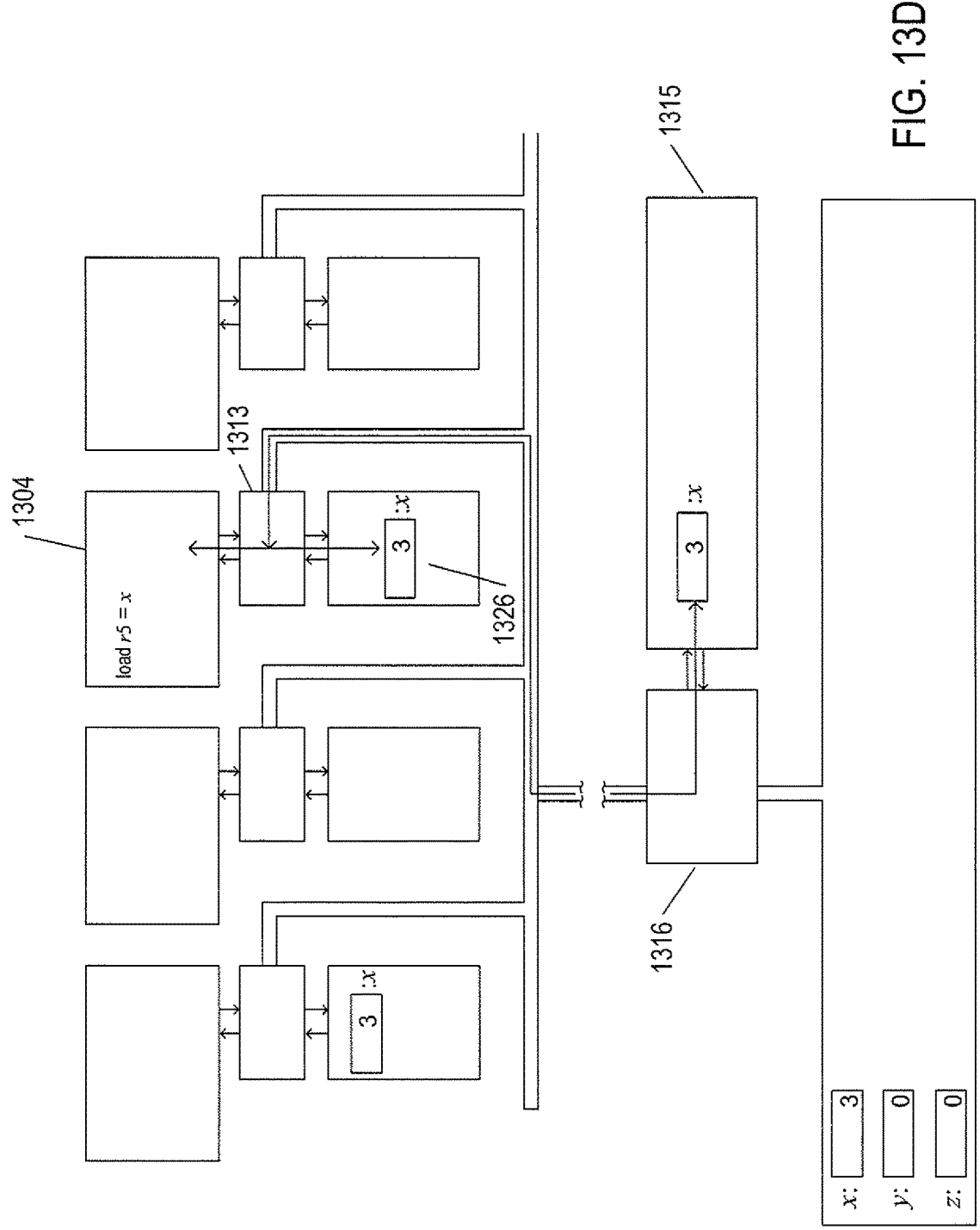

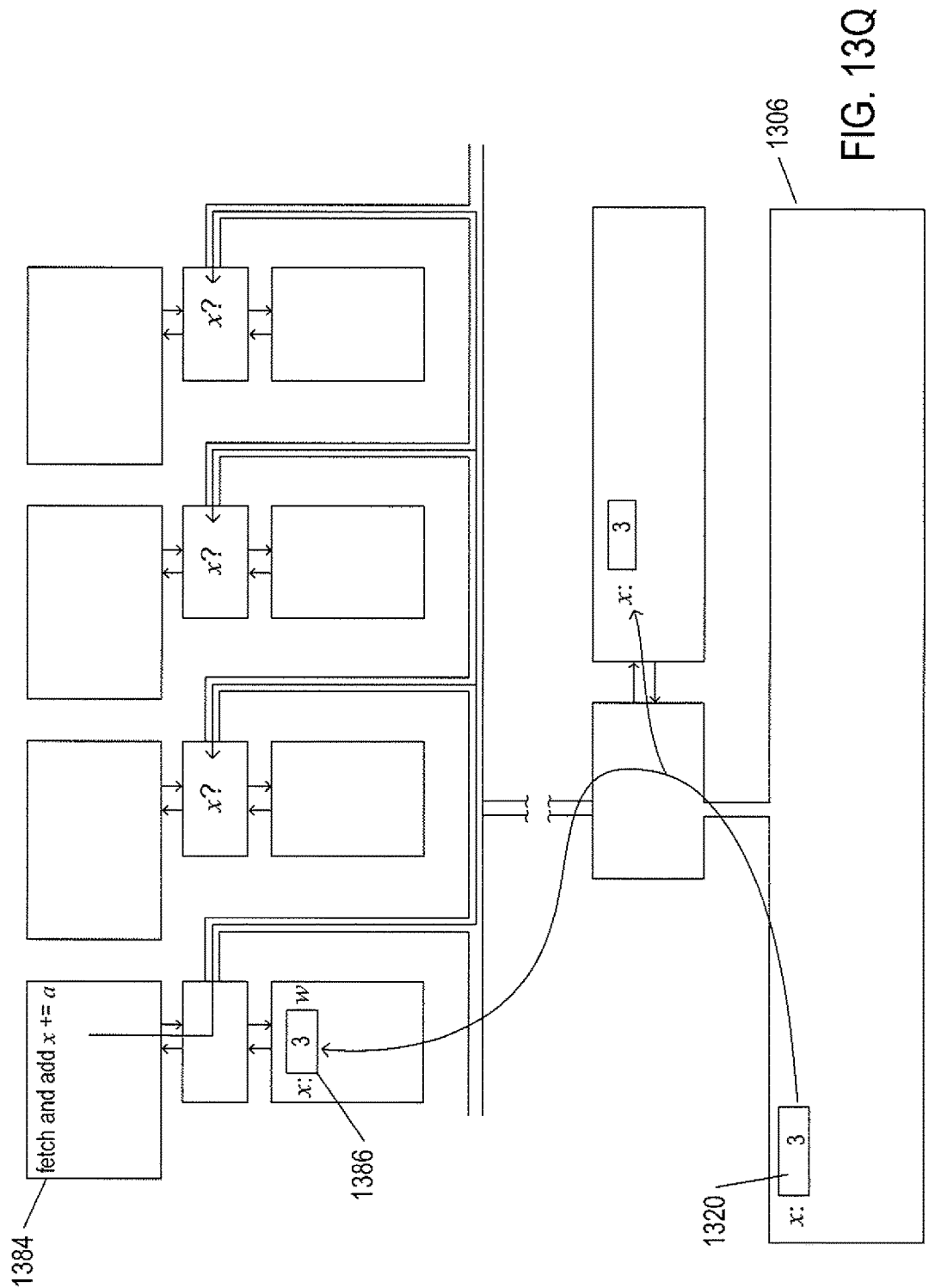

US 10,108,349 B2

METHOD AND SYSTEM THAT INCREASE STORAGE-STACK THROUGHPUT

TECHNICAL FIELD

The current document is directed to input/output ("I/O") subsystems of computer systems and, in particular, to a storage stack that includes I/O latency monitoring and an I/O-scheduler bypass.

BACKGROUND

Although increases in the instruction-execution bandwidth of processors has long been viewed as a benchmark for computer-system innovation, the rate at which data can be transferred from memory to mass-storage devices, network interface cards, and other I/O devices, and the corresponding rate at which data can be transferred from I/O devices to memory, may often be the rate-limiting bottleneck for computer-system performance. For many years, I/O data-transfer rates significantly lagged the rate at which processors, multi-core processors, and multiple processors within multi-processor computer systems execute computer instructions. Recently, the advent of solid-state disks and high-capacity electronic memories has begun to greatly improve I/O data-transfer rates. Nonetheless, the computational bandwidth of many computer systems remains critically limited by I/O data-transfer rates. For this reason, designers, developers, vendors, and, ultimately, users of various types of computer systems continue to seek methods, devices, and systems that provide greater I/O data-transfer bandwidths in order to increase the overall computational bandwidth of computer systems

SUMMARY

The current document is directed to a storage stack subsystem of a computer system that transfers data between memory and various data-storage devices and subsystems and that processes I/O requests at a greater rate than conventional storage stacks. In one implementation, the disclosed storage stack includes a latency monitor, an I/O-scheduling bypass pathway, and short-circuit switch, controlled by the latency monitor. While the latency associated with I/O-request execution remains below a threshold latency, I/O-scheduling components of the storage stack are bypassed, with I/O requests routed directly to multiple input queues associated with one or more high-throughput multi-queue I/O device controllers. When the latency for execution of I/O requests rises above the threshold latency, I/O requests are instead directed to I/O-scheduling components of the storage stack, which attempt to optimally reorganize the incoming I/O-request stream and optimally distribute I/O-requests among multiple input queues associated I/O device controllers.

DETAILED DESCRIPTION OF EMBODIMENTS

The current document is directed to methods and systems for increasing the I/O data-transfer throughput of I/O subsystems within computer systems. One set of implementations is directed to a storage stack that includes I/O-request-execution-latency monitoring and a latency-controlled bypass of traditional I/O-scheduling components. In a first subsection below, an overview of computer systems and computer architecture is provided, with reference to FIGS. 1-12. In a second subsection, the problems associated with shared memory in multi-processing-entity computational environments is described, in detail, with reference to FIGS. 13A-15J. In the third subsection, the storage stack to which the current document is directed is described in detail.

Overview of Computer Systems and Computer Architecture

Figure 1:
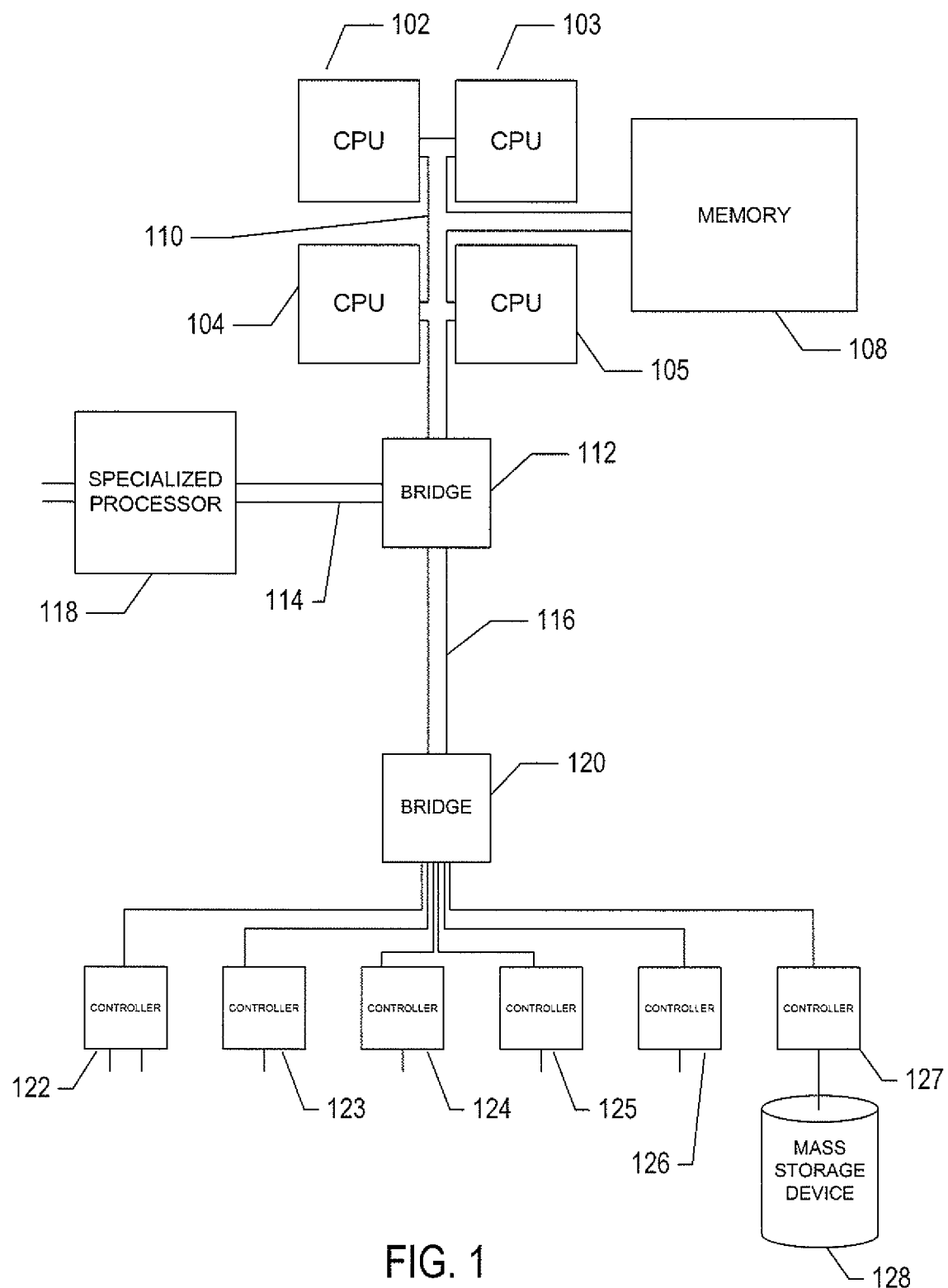
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
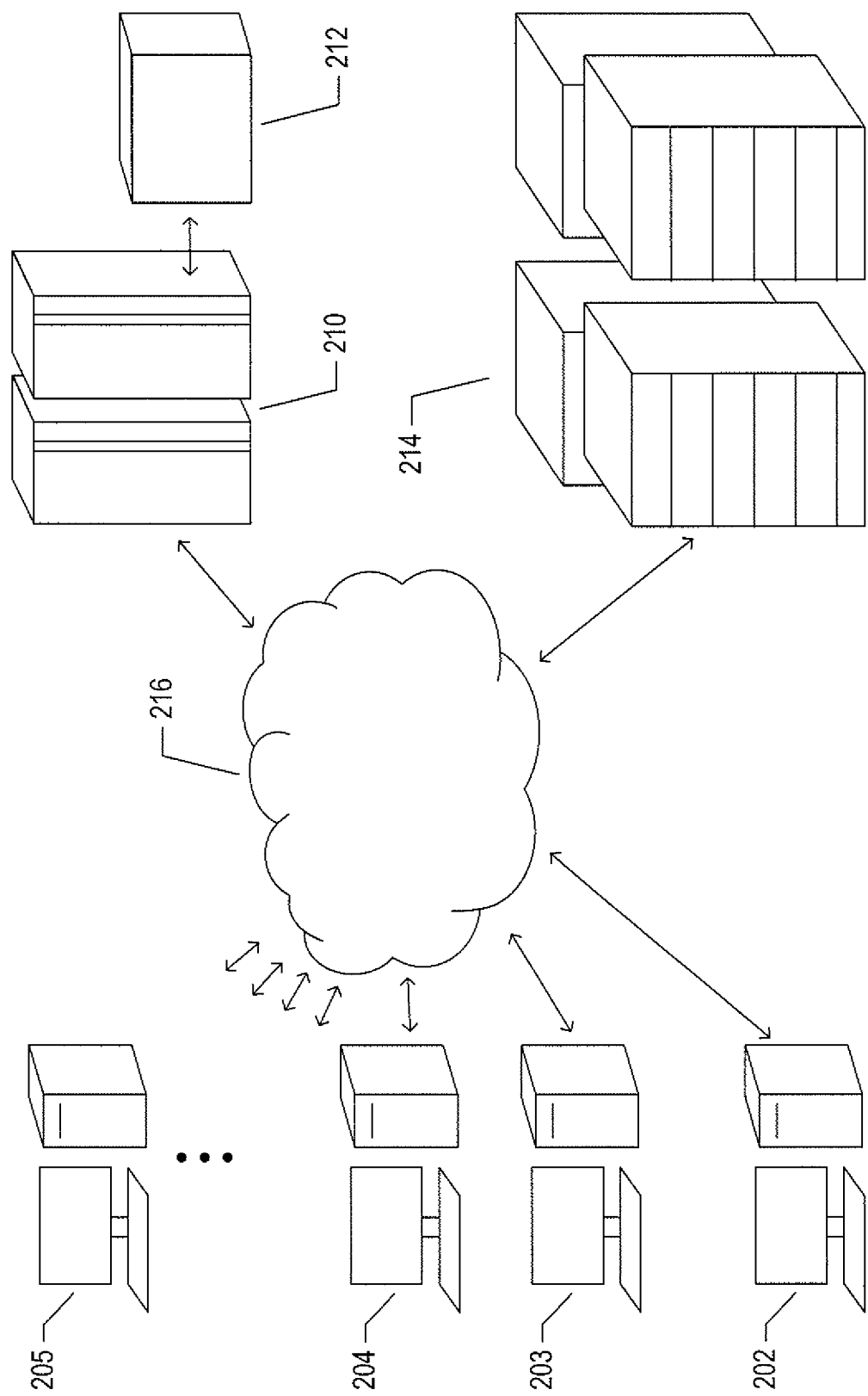
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computer systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
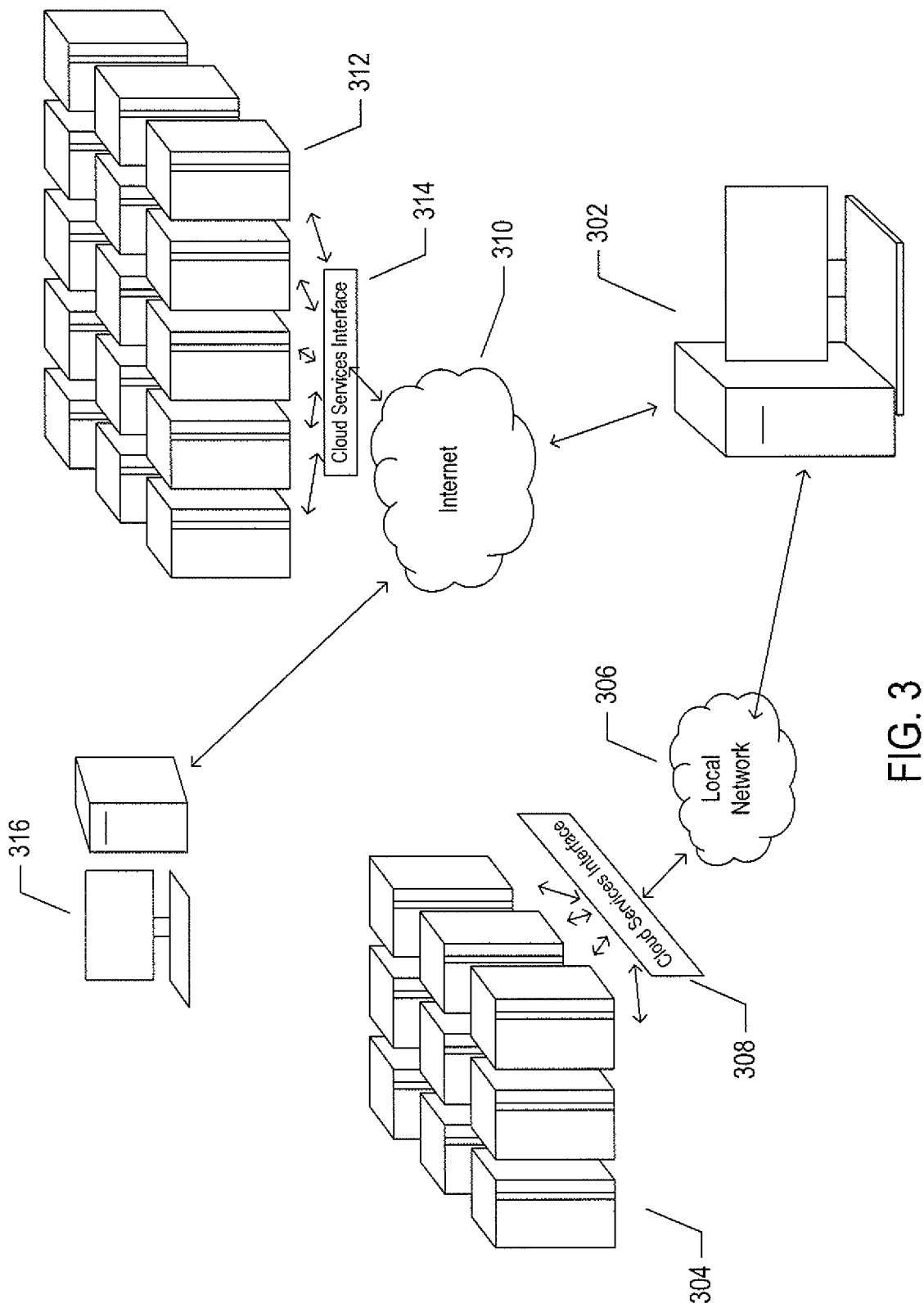
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Figure 4:
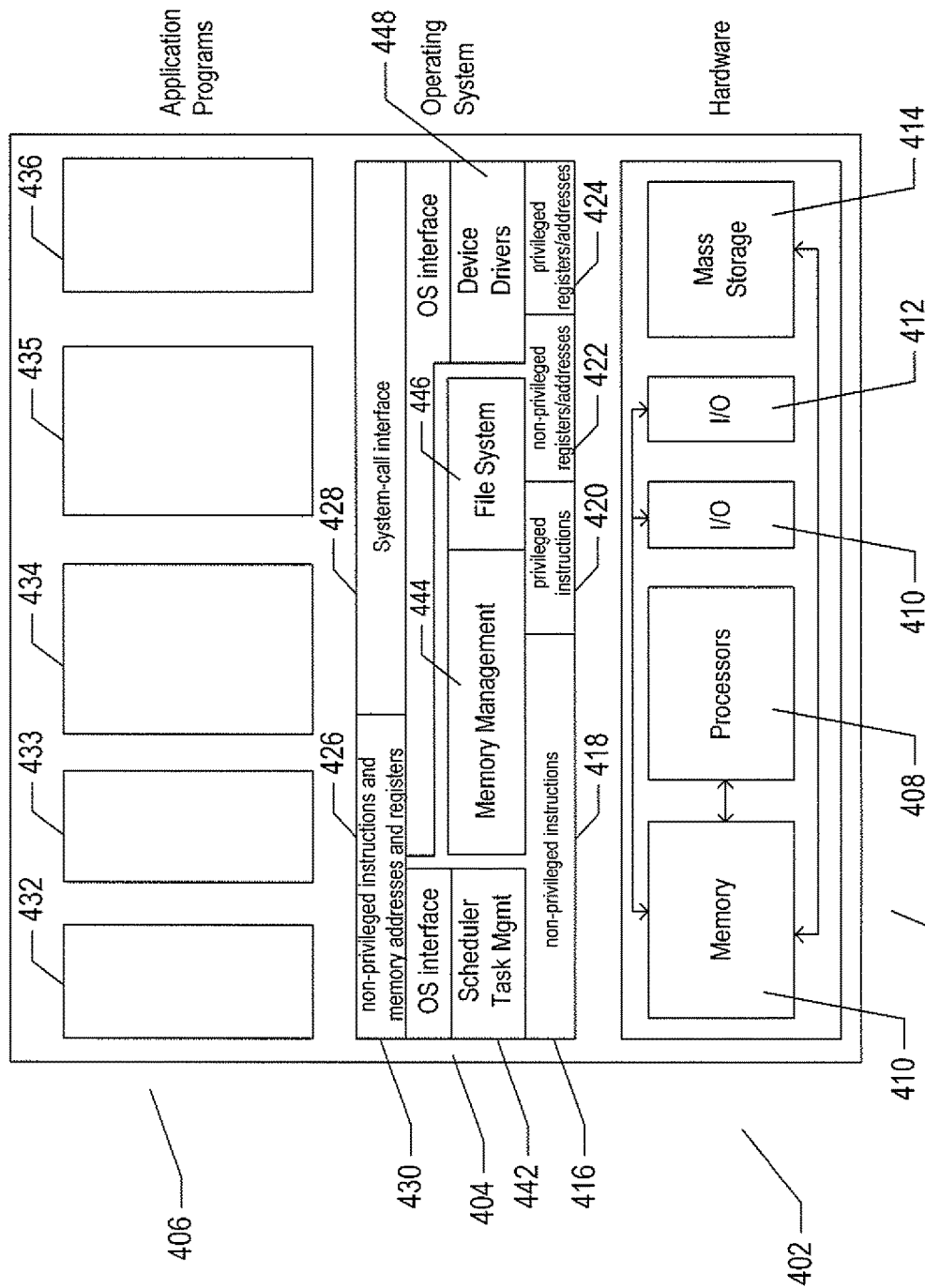
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory resources as a high-level, easy-to-access, file-system interface. In many modern operating systems, the operating system provides an execution environment for concurrent execution of a large number of processes, each corresponding to an executing application program, on one or a relatively small number of hardware processors by temporal multiplexing of process execution. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
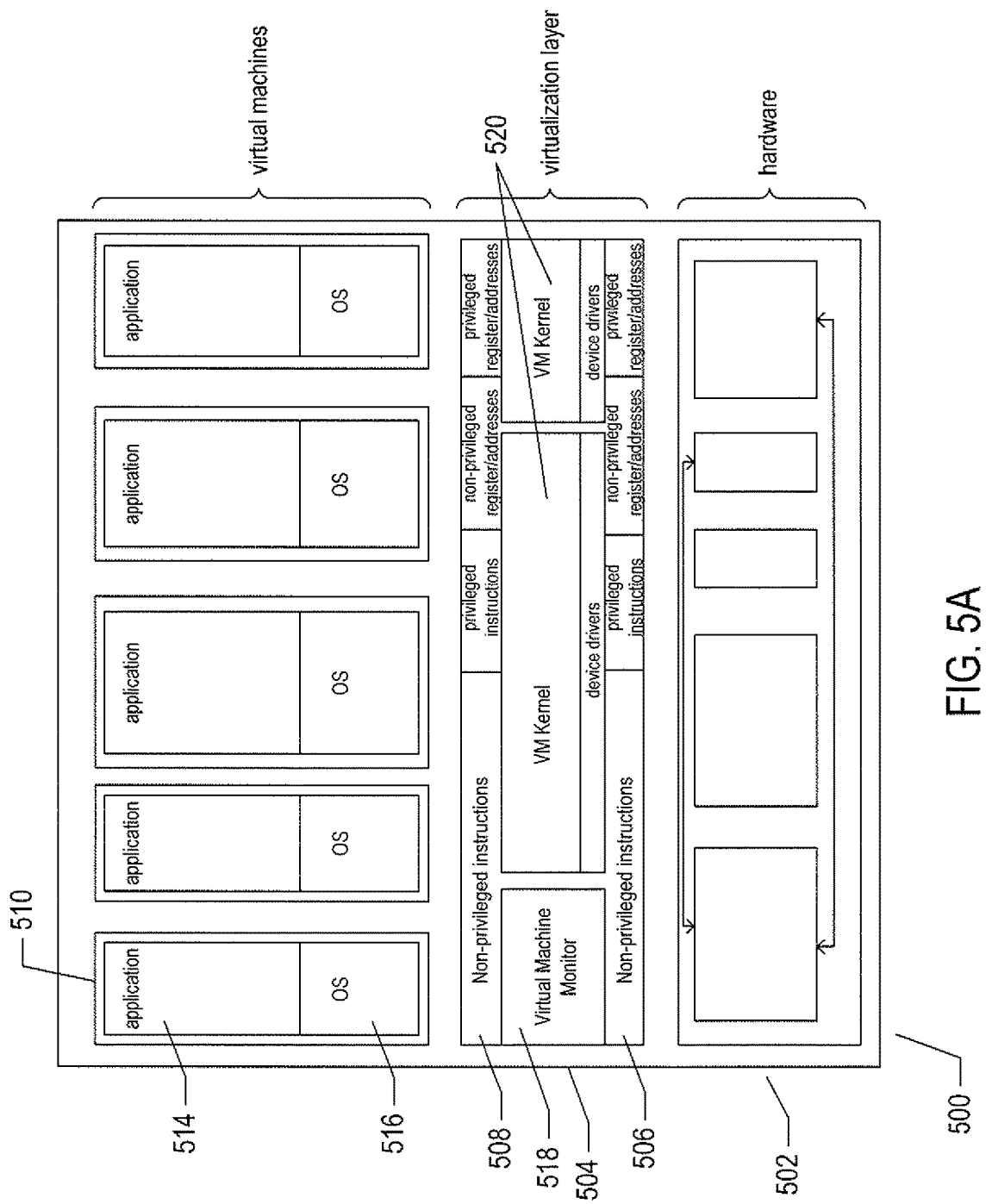
FIGS. 5A-B illustrate two types of virtual machine and virtual-machine execution environments.
Figure 5B:
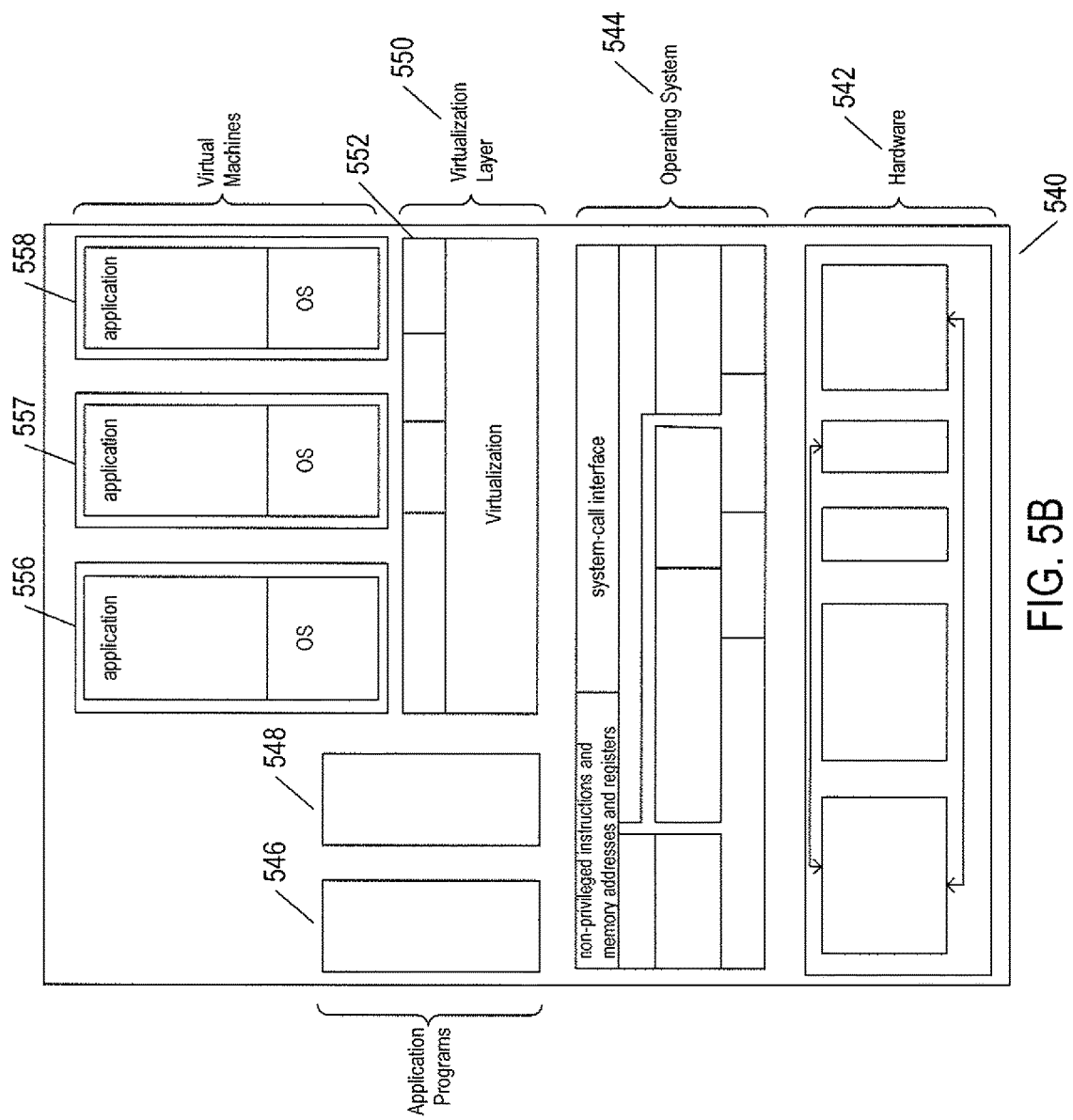

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, similar to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer, such as power supplies, controllers, processors, busses, and data-storage devices.

Figure 6A:
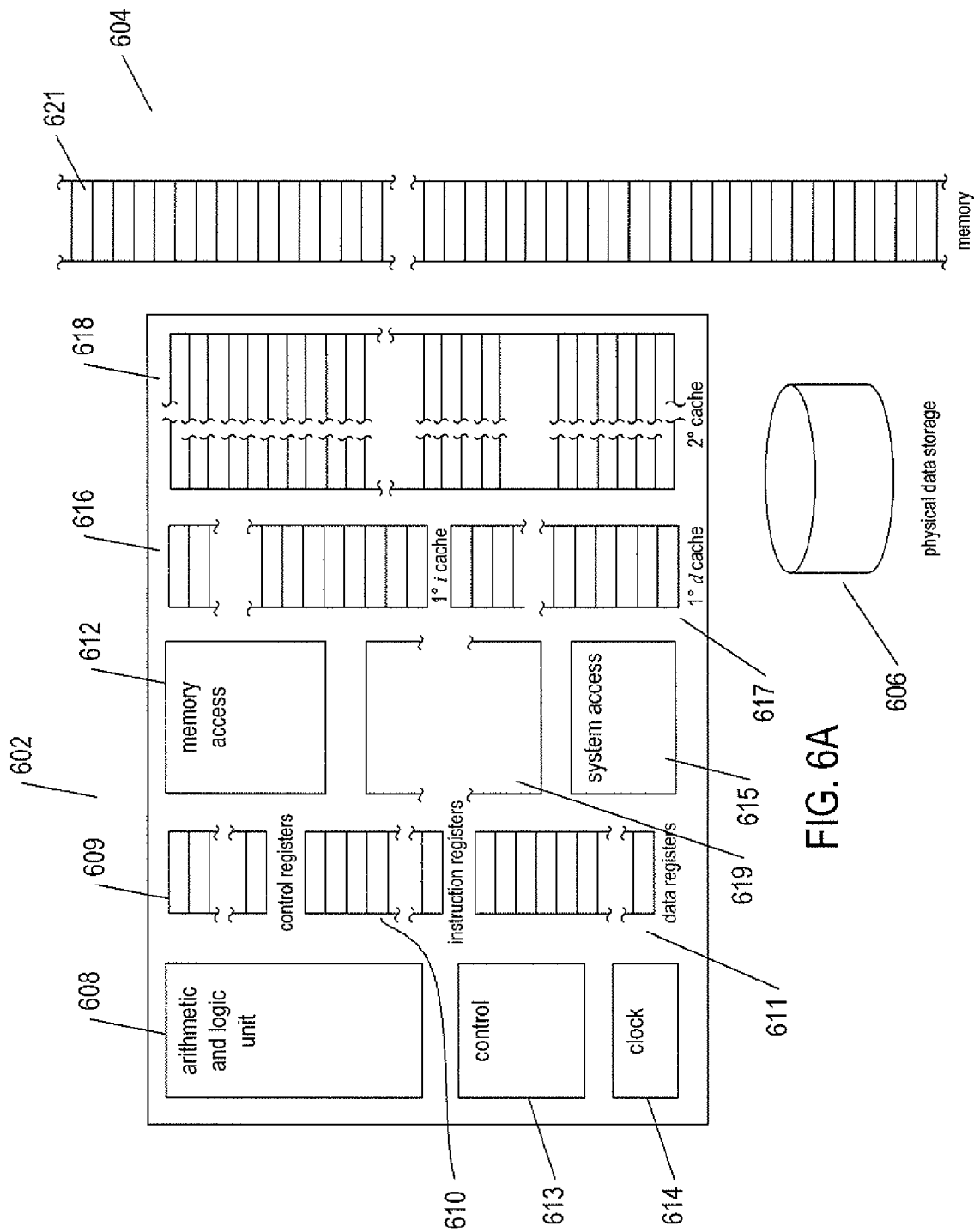
FIGS. 6A-B illustrate a hypothetical computer system.
Figure 6B:
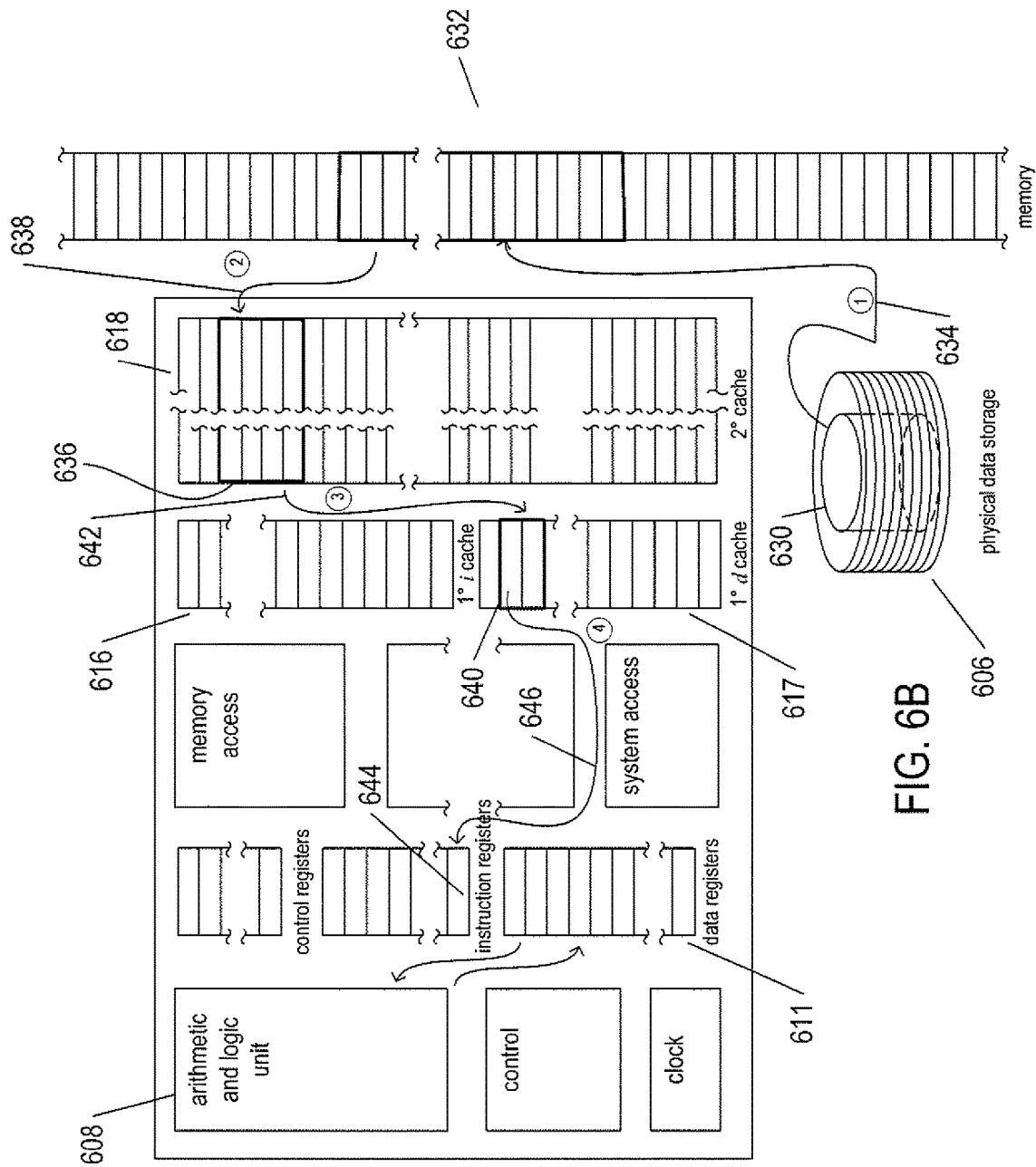

FIGS. 6A-C illustrate a hypothetical computer system. The hypothetical system includes a processor 602, a memory 604, and a physical data-storage device 606. The processor includes an arithmetic and logic unit 608, control registers 609, instruction registers 610, data registers 611, a memory-access controller 612, a control unit 613 that coordinates operation and interoperation of the various processor components, a hardware clock 614, a system-access controller 615, a primary instruction cache 616, a primary data cache 617, a secondary combined data and instruction cache 618, and other components represented by the rectangle of indeterminate size 619 included in the block diagram of the processor 602. The memory 604 is represented as a linear address space, with each cell or element, such as cell 621, representing a unit of memory storage, such as a 64-bit word.

FIG. 6B illustrates, using the examples system shown in FIG. 6A, how data and instructions migrate from the physical data-storage device through memory into processor caches and registers in order to be executed and operated on, respectively, by the processor. In general, both data and instructions are stored in the non-volatile physical data-storage device 606. Data blocks and sectors, represented in FIG. 6B by a thin cylinder 630 comprising tracks read together by a multi-read disk head from multiple disk platters, is transferred under processor control to one or more blocks or pages of memory 632. The data blocks contain computer instructions and data. The movement of instructions and data from the physical data-storage device to memory is represented by a first curved arrow 634 in FIG. 6B. In order for instructions to be executed and data to be operated on, the instructions and data are moved from memory to the processor. First, assuming the memory block or page 632 contains instructions, the block of instructions is moved to the secondary cache 636, as represented by curved arrow 638. A portion of the instructions is moved from the secondary cache to the primary instruction cache 640, as represented by curved arrow 642. A particular instruction is executed by moving the instruction from the primary cache to an instruction register 644, as represented by arrow 646. The instruction is then fetched from the instruction register by the arithmetic and logic unit 608 and executed. Instructions that produce data values result in storage of computed data values in data registers. Similarly, data migrates from the physical data-storage device to memory, from memory to the secondary cache, from the secondary cache to the primary data cache 617, and from the primary data cache to the data registers 611. The processor operates on the data registers, as controlled by instructions fetched and executed from the instruction registers.

The instruction and data registers represent the most expensive and most quickly accessed data-storage units within the computer system. The next most expensive and next most quickly accessed storage components are the primary instruction cache 616 and the primary data cache 617. The secondary cache 618 is somewhat less expensive and more slowly accessed. The memory 632 is much less expensive and much less quickly accessed by the processor, and the physical data-storage device 606 is the least expensive data-storage component, on a per-instruction or per-data-unit basis, and is much more slowly accessed by the computer system. The processor caches and registers are organized so that instructions that are repetitively executed within a short span of time, such as instructions within a tight loop of a routine, may reside in the instruction registers or the instruction registers combined with the primary instruction cache, in order to facilitate rapid iterative execution of the loop. Similarly, instructions of a longer, but repetitively executed routine tend to reside in the primary instruction cache or in a combination of the primary instruction cache and the secondary cache, in order to avoid the need to repetitively access instructions of the routine from memory. In similar fashion, the instructions of a large program or software component may reside, over long periods of time, within memory 632, rather than being repetitively read into memory from the physical data-storage device. In modern computer systems, the address space corresponding to memory is virtual, having a much larger virtual length than the actual length of the physical address space represented by physical memory components, with data transferred back and forth from the physical data-storage device and memory, under processor control, in order to support the illusion of a much larger virtual address space than can be contained, at any particular point in time, in the smaller physical memory.

Any particular component or subsystem of the simple computer system may, over any given period of time, represent a computational bottleneck that limits the throughput of the computer system. For example, were the computer system to execute a tiny routine that can be completely stored within the instruction registers and that operates on only a few data items that can be stored in the data registers, the computational throughput would likely be limited by the speed of the arithmetic and logic unit and various internal communication pathways within the processor. By contrast, were the computing system executing a modestly sized program that could be stored within the secondary cache 618 and that operated on data that could be stored in either the primary data cache or a combination of the primary data cache and the secondary cache, the computational throughput of the computer system may be limited by the processor control components and internal busses or signal paths through which data is transferred back and forth between the caches and registers. When the computer system runs a multi-tasking operating system that, in turn, runs multiple routines on behalf of multiple users, requiring instructions and data to be constantly moved between memory and processor caches, the throughput of the computer system may well be constrained and governed by the speed of a memory bus through which instructions and data pass between the memory and the processor and the processor and memory. In certain cases, when very large amount of data are read in and modified from the physical data-storage device, the throughput of the computer system may be constrained by the speed of access to data within the physical data-storage device. In certain cases, the computational throughput may be limited by complex interactions between components while in other cases, computational throughput of the system may be limited by a single component or subsystem that represents a bottleneck within the computer system with respect to the tasks being carried out by the computer system. In large virtual data centers, many different components, subsystems, collections of discrete systems, networking infrastructure, and other subsystems and subcomponents may represent bottlenecks, under particular loads at particular times, within the complex, distributed virtual data centers.

Figure 7:
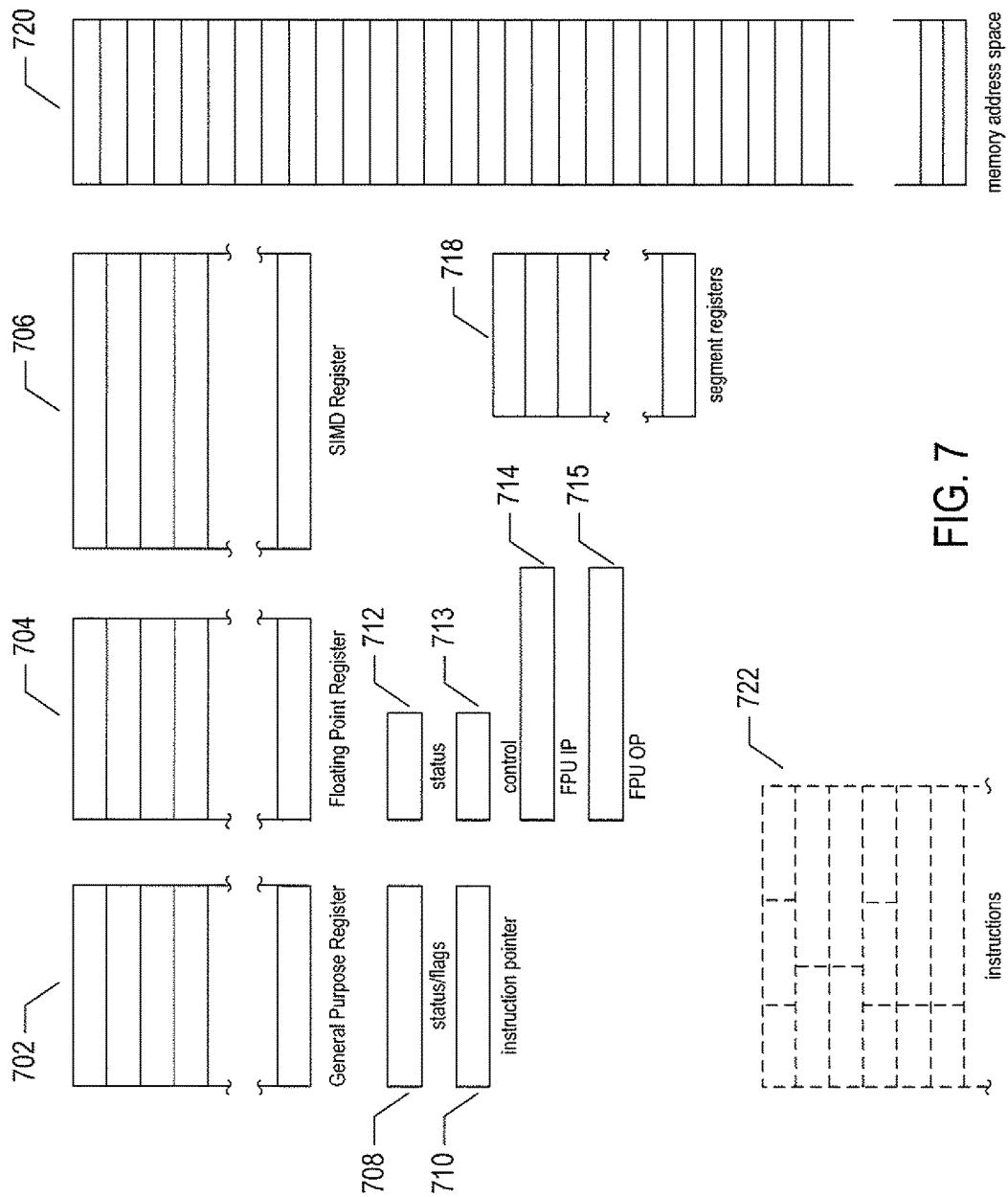
FIG. 7 illustrates an instruction-set architecture ("ISA") provided by a modern processor.

FIG. 7 illustrates an instruction-set architecture ("ISA") provided by a modern processor. The ISA commonly includes a set of general-purpose registers 702, a set of floating-point registers 704, a set of single-instruction-multiple-data ("SIMD") registers 706, a status/flags register 708, an instruction pointer 710, special status 712, control 713, and instruction-pointer 714 and operand 715 registers for floating-point instruction execution, segment registers 718 for segment-based addressing, a linear virtual-memory address space 720, and the definitions and specifications of the various types of instructions that can be executed by the processor 722. The length, in bits, of the various registers is generally implementation dependent, often related to the fundamental data unit that is manipulated by the processor when executing instructions, such as a 16-bit, 32-bit, or 64-bit word and/or 64-bit or 128-bit floating-point words. When a computational entity is instantiated within a computer system, the values stored in each of the registers and in the virtual memory-address space together comprise the machine state, or architecture state, for the computational entity. While the ISA represents a level of abstraction above the actual hardware features and hardware resources of a processor, the abstraction is generally not too far removed from the physical hardware. As one example, a processor may maintain a somewhat larger register file that includes a greater number of registers than the set of general-purpose registers provided by the ISA to each computational entity. ISA registers are mapped by processor logic, often in cooperation with an operating system and/or virtual-machine monitor, to registers within the register file, and the contents of the registers within the register file may, in turn, be stored to memory and retrieved from memory, as needed, in order to provide temporal multiplexing of computational-entity execution.

Figure 8:
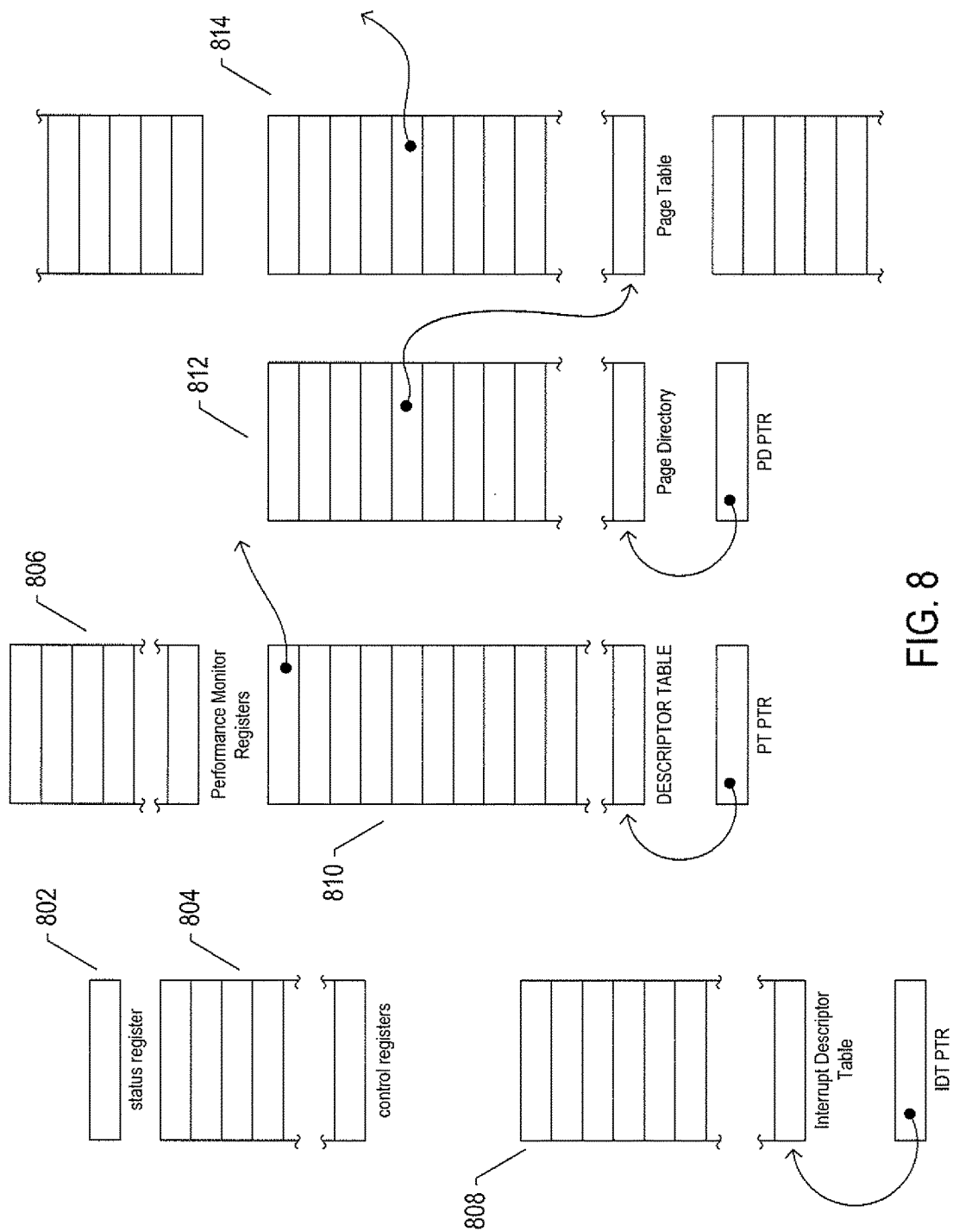
FIG. 8 illustrates additional processor features and resources used by virtual-machine monitors, operating systems, and other privileged control programs.

FIG. 8 illustrates additional processor features and resources used by virtual-machine monitors, operating systems, and other privileged control programs. These processor features, or hardware resources, can generally be accessed only by control programs operating at higher levels than the privilege level at which application programs execute. These system resources include an additional status register 802, a set of additional control registers 804, a set of performance-monitoring registers 806, an interrupt-descriptor table 808 that stores descriptions of entry points for interrupt handlers, the descriptions including references to memory descriptors stored in a descriptor table 810. The memory descriptors stored in the descriptor table may be accessed through references stored in the interrupt-descriptor table, segment selectors included in virtual-memory addresses, or special task-state segment selectors used by an operating system to store the architectural state of a currently executing process. Segment references are essentially pointers to the beginning of virtual-memory segments. Virtual-memory addresses are translated by hardware virtual-memory-address translation features that ultimately depend on a page directory 812 that contains entries pointing to page tables, such as page table 814, each of which, in turn, contains a physical memory address of a virtual-memory page.

Figure 9:
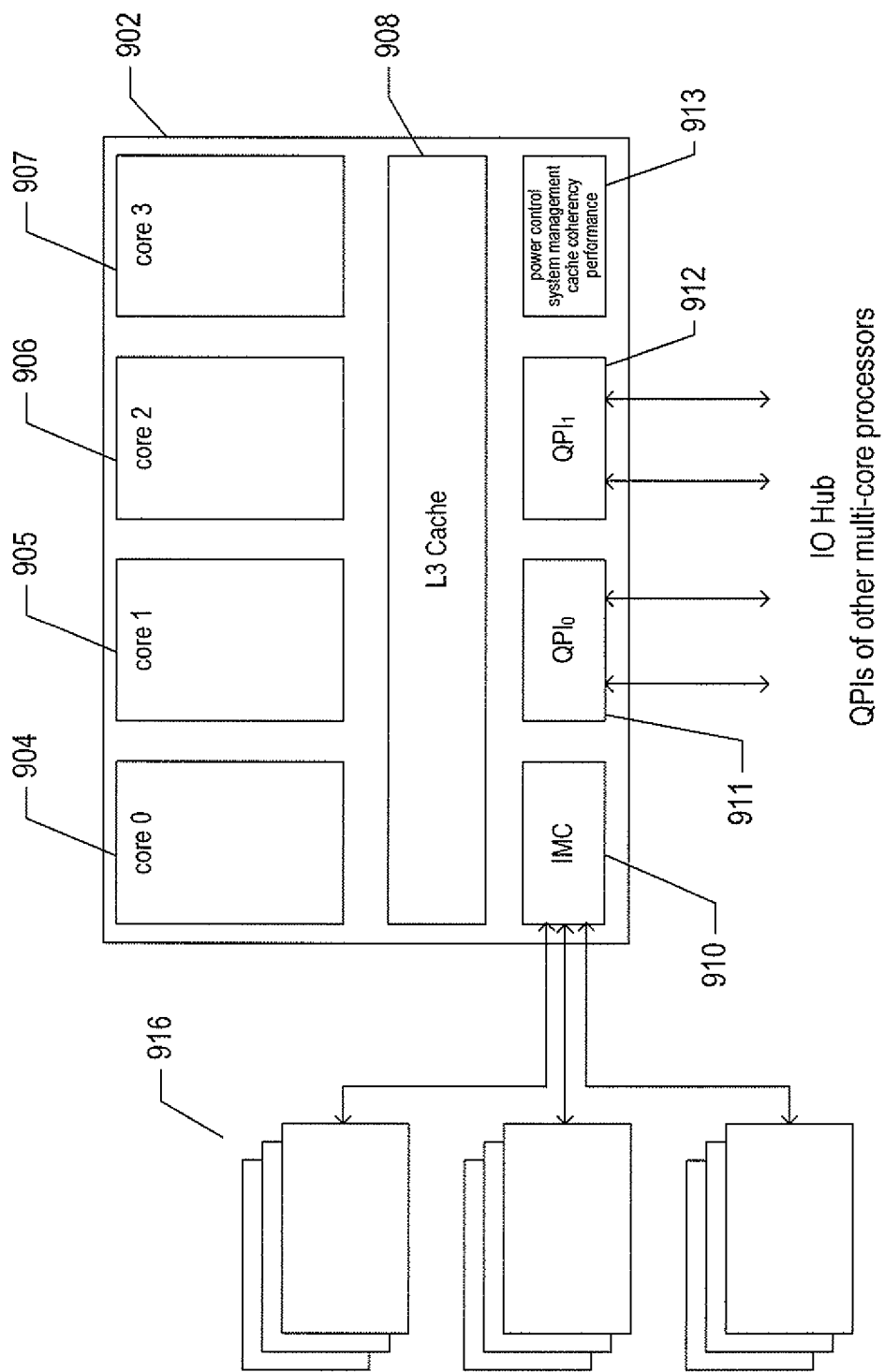
FIG. 9 illustrates an example multi-core processor.

FIG. 9 illustrates an example multi-core processor. The multi-core processor 902 includes four processor cores 904-907, a level-3 cache 908 shared by the four cores 904-907, and additional interconnect and management components 910-913 also shared among the four processor cores 904-907. Integrated memory controller ("IMC") 910 manages data transfer between multiple banks of dynamic random access memory ("DRAM") 916 and the level-3 cache ("L3 cache") 908. Two interconnect ports 911 and 912 provide data transfer between the multi-core processor 902 and an IO hub and other multi-core processors. A final, shared component 913 includes power-control functionality, system-management functionality, cache-coherency logic, and performance-monitoring logic.

Each core in a multi-core processor is essentially a discrete, separate processor that is fabricated, along with all the other cores in a multi-core processor, within a single integrated circuit. As discussed below, each core includes multiple instruction-execution pipelines and internal L1 caches. In some cases, each core also contains an L2 cache, while, in other cases, pairs of cores may share an L2 cache. As discussed further, below, SMT-processor cores provide for simultaneous execution of multiple hardware threads. Thus, a multi-SMT-core processor containing four SMT-processors that each supports simultaneous execution of two hardware threads can be viewed as containing eight logical processors, each logical processor corresponding to a single hardware thread.

The memory caches, such as the L3 cache 908 and the multi-core processor shown in FIG. 9 is generally SRAM memory, which is much faster but also more complex and expensive than DRAM memory. The caches are hierarchically organized within a processor. The processor attempts to fetch instructions and data, during execution, from the smallest, highest-speed L1 cache. When the instruction or data value cannot be found in the L1 cache, the processor attempts to find the instruction or data in the L2 cache. When the instruction or data is resident in the L2 cache, the instruction or data is copied from the L2 cache into the L1 cache. When the L1 cache is full, instruction or data within the L1 cache is evicted, or overwritten, by the instruction or data moved from the L2 cache to the L1 cache. When the data or instruction is not resident within the L2 cache, the processor attempts to access the data or instruction in the L3 cache, and when the data or instruction is not present in the L3 cache, the data or instruction is fetched from DRAM system memory. Ultimately, data and instruction are generally transferred from a mass-storage device to the DRAM memory. As with the L1 cache, when intermediate caches are full, eviction of an already-resident instruction or data generally occurs in order to copy data from a downstream cache into an upstream cache.

Figure 10:
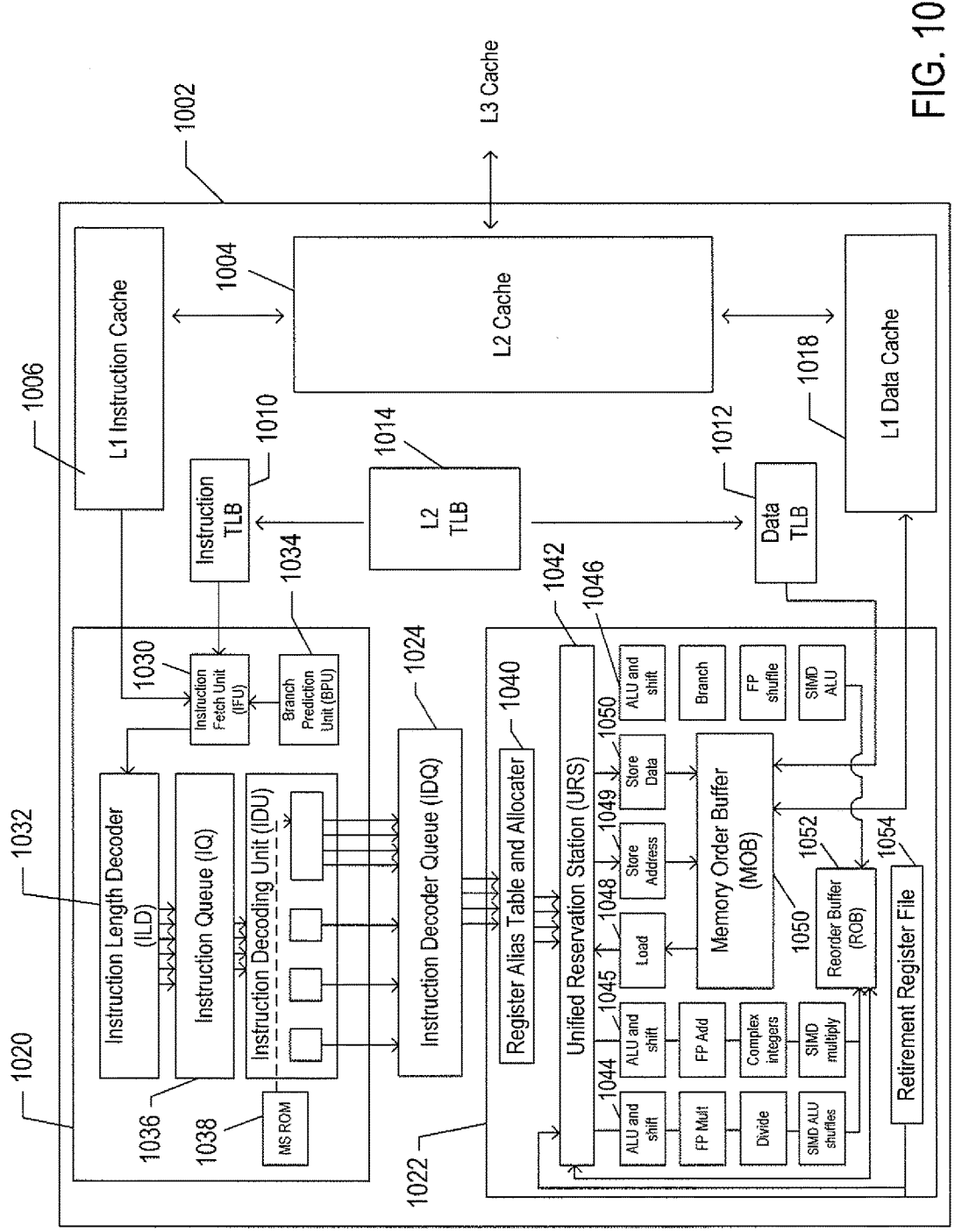
FIG. 10 illustrates the components of an example processor core.

FIG. 10 illustrates the components of an example processor core. As with the descriptions of the ISA and system registers, with reference to FIGS. 7 and 8, and with the description of the multi-core processor, with reference to FIG. 9, the processor core illustrated in FIG. 10 is intended as a high-level, relatively generic representation of a processor core. Many different types of multi-core processors feature different types of cores that provide different ISAs and different constellations of system registers. The different types of multi-core processors may use quite different types of data structures and logic for mapping virtual-memory addresses to physical addresses. Different types of multi-core processors may provide different numbers of general-purpose registers, different numbers of floating-point registers, and vastly different internal execution-pipeline structures and computational facilities.

The processor core 1002 illustrated in FIG. 10 includes an L2 cache 1004 connected to an L3 cache (908 in FIG. 9) shared by other processor cores as well as to an L1 instruction cache 1006 and an L1 data cache 1018. The processor core also includes a first-level instruction translation-lookaside buffer ("TLB") 1010, a first-level data TLB 1012, and a second-level, universal TLB 1014. These TLBs store virtual-memory translations for the virtual-memory addresses of instructions and data stored in the various levels of caches, including the L1 instruction cache, the L1 data cache, and L2 cache. When a TLB entry exists for a particular virtual-memory address, accessing the contents of the physical memory address corresponding to the virtual-memory address is far more computationally efficient than computing the physical-memory address using the previously described page directory and page tables.

The processor core 1002 includes a front-end in-order functional block 1020 and a back-end out-of-order-execution engine 1022. The front-end block 1020 reads instructions from the memory hierarchy and decodes the instructions into simpler microinstructions which are stored in the instruction decoder queue ("IDQ") 1024. The microinstructions are read from the IDQ by the execution engine 1022 and executed in various parallel execution pipelines within the execution engine. The front-end functional block 1020 include an instruction fetch unit ("IFU") 1030 that fetches 16 bytes of aligned instruction bytes, on each clock cycle, from the L1 instruction cache 1006 and delivers the 16 bytes of aligned instruction bytes to the instruction length decoder ("ILD") 1032. The IFU may fetch instructions corresponding to a particular branch of code following a branch instruction before the branch instruction is actually executed and, therefore, before it is known with certainty that the particular branch of code will be selected for execution by the branch instruction. Selection of code branches from which to select instructions prior to execution of a controlling branch instruction is made by a branch prediction unit 1034. The ILD 1032 processes the 16 bytes of aligned instruction bytes provided by the instruction fetch unit 1030 on each clock cycle in order to determine lengths of the instructions included in the 16 bytes of instructions and may undertake partial decoding of the individual instructions, providing up to six partially processed instructions per clock cycle to the instruction queue ("IQ") 1036. The instruction decoding unit ("IDU") reads instructions from the IQ and decodes the instructions into microinstructions which the IDU writes to the IDQ 1024. For certain complex instructions, the IDU fetches multiple corresponding microinstructions from the MS ROM 1038.

The back-end out-of-order-execution engine 1022 includes a register alias table and allocator 1040 that allocates execution-engine resources to microinstructions and uses register renaming to allow instructions that use a common register to be executed in parallel. The register alias table and allocator component 1040 then places the microinstructions, following register renaming and resource allocation, into the unified reservation station ("URS") 1042 for dispatching to the initial execution functional units 1044-1046 and 1048-1050 of six parallel execution pipelines. Microinstructions remain in the URS until all source operands have been obtained for the microinstructions. The parallel execution pipelines include three pipelines for execution of logic and arithmetic instructions, with initial functional units 1044-1046, a pipeline for loading operands from memory, with initial functional unit 1048, and two pipelines, with initial functional units 1049-1050, for storing addresses and data to memory. A memory-order buffer ("MOB") 1050 facilitates speculative and out-of-order loads and stores and ensures that writes to memory take place in an order corresponding to the original instruction order of a program. A reorder buffer ("ROB") 1052 tracks all microinstructions that are currently being executed in the chains of functional units and, when the microinstructions corresponding to a program instruction have been successfully executed, notifies the retirement register file 1054 to commit the instruction execution to the architectural state of the process by ensuring that ISA registers are appropriate updated and writes to memory are committed.

A processor core is, of course, an exceedingly complex device, containing a forest of signal paths and millions of individual transistors and other circuit components. The myriad components and operational details are far beyond the scope of the current discussion. Instead, the current discussion is intended to provide a context for the performance-imbalance-monitoring registers included within a processor in order to facilitate performance monitoring with respect to hardware threads.

Figure 11:
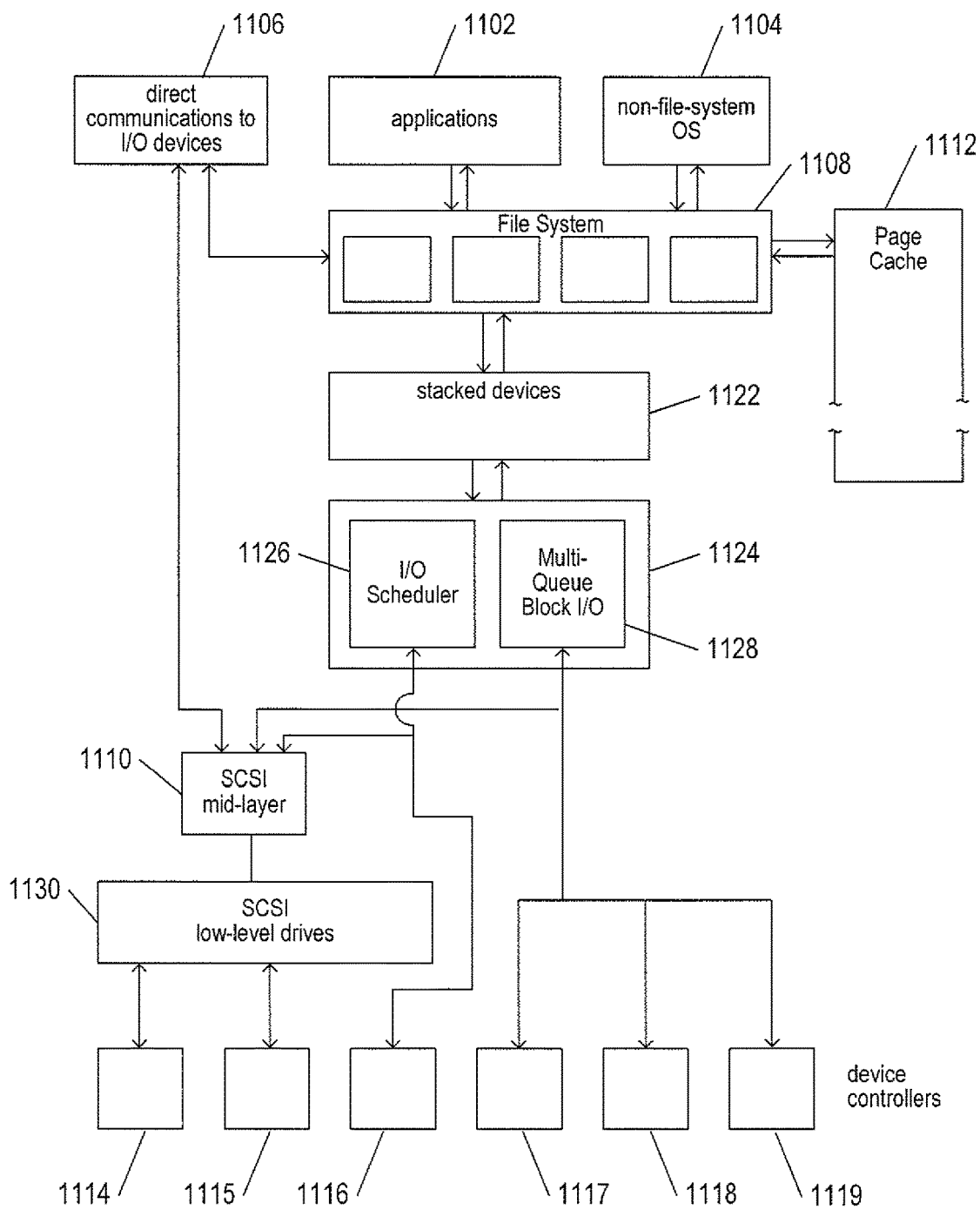
FIG. 11 illustrates the storage stack within a computer system.

FIG. 11 illustrates the storage stack within a computer system. The storage stack is a hierarchically layered set of components that interconnect application programs, portions of an operating system, and remote computational entities with the controllers that control access to, and operation of, various types of data-storage devices. In FIG. 11, executing application programs are represented by rectangle 1102, the non-file-system portion of an operating system is represented by rectangle 1104, and remote computational entities accessing data-storage facilities of the local computer system through communications devices are represented by rectangle 1106. The applications and non-file-system portions of the operating system 1102 and 1104 access local data-storage devices through the file system 1108 of the operating system. Remote processing entities 1106 may access data-storage devices through the file system or may directly access a small-computer-system-interface ("SCSI") middle layer 1110. The file system maintains a page cache 1112 for caching data retrieved from storage devices on behalf of applications, non-file-system OS components, and remote computational entities. The file system, in turn, accesses, the low-level data-storage device controllers 1114-1119 through a stacked-devices layer 1122 and block layer 1124. The stacked-devices layer 1122 implements various types of multi-device aggregations, such as redundant array of independent disks ("RAID") that provide for fault-tolerant data storage. The block layer 1124 stores data blocks in, and retrieves data blocks from, data-storage devices. Traditional devices with single input and output queues are accessed via an I/O scheduler 1126 while more modern, high-throughput devices that provide for large numbers of input and output queues from which device controllers fetch I/O requests, in parallel, for parallel execution of the I/O requests by high-throughput devices are accessed through a multi-queue block I/O component 1128. The SCSI midlayer 1110 and lower-level SCSI drives 1130 provide access to the device controllers for data-storage devices with SCSI interfaces 1114-1115. Other types of I/O device controllers 1116 that do not provide the SCSI interface are directly accessed by the I/O scheduler component 1126. The device controllers for modern, multi-queue, high-throughput data-storage devices 1117-1119 are accessed directly by the multi-queue block I/O component 1128.

Figure 12:
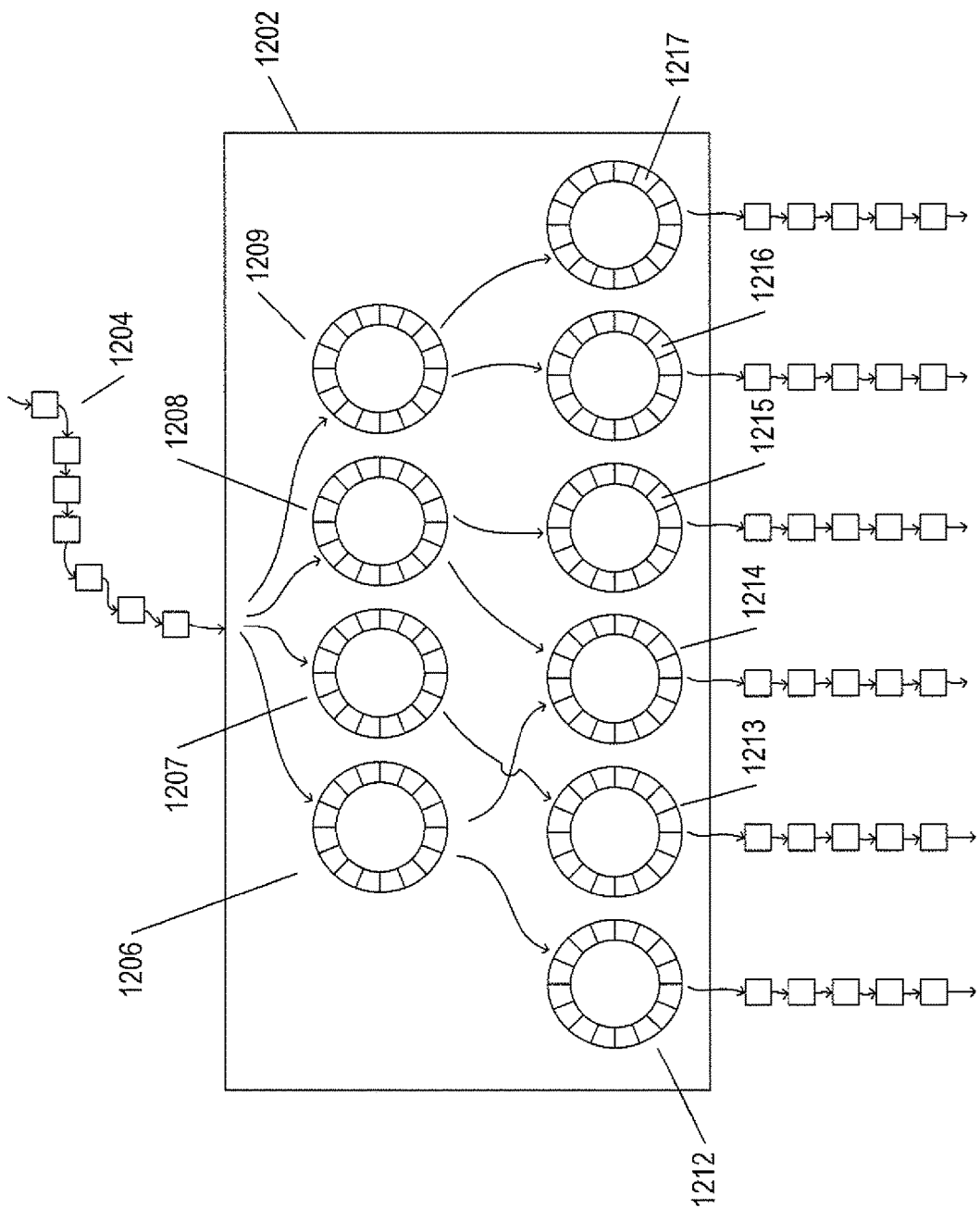
FIG. 12 illustrates the general functionality of the block layer of the storage stack (1124 in FIG. 11).

FIG. 12 illustrates the general functionality of the block layer of the storage stack (1124 in FIG. 11). The block layer 1202 receives a stream of I/O requests 1204 from the file system (1108 in FIG. 11). The block layer 1202 internally queues the incoming requests to internal input queues 1206-1209. Then, the block layer carries out various types of rearrangements and reorganizations of the queued I/O requests and outputs the I/O requests to output queues 1212-1217, from which the I/O requests are dequeued by various low-level storage-device controllers. The traditional I/O scheduler generally reorders incoming I/O requests for a particular device in order to minimize access latencies due to order-dependant I/O-request-execution characteristics of the device. Traditional magnetic storage devices, for example, employ heads disposed along an actuator arm that moves radially with respect to disk-shaped magnetic platters in order to access circular tracks of data. Actuator arm movement is a much higher-latency operation than waiting for a particular appropriate block within a circular track to spin beneath the disk head. Therefore, I/O requests are rescheduled, using techniques similar to the techniques used to schedule elevator travel within high-rise buildings, in order to minimize the amount of head movement involved in accessing a number of recently input I/O requests. The multi-queue block I/O component (1128 in FIG. 11), by contrast, may be concerned with distributing input I/O requests among multiple input queues associated with a particular high-throughput device.

Figure 13A:
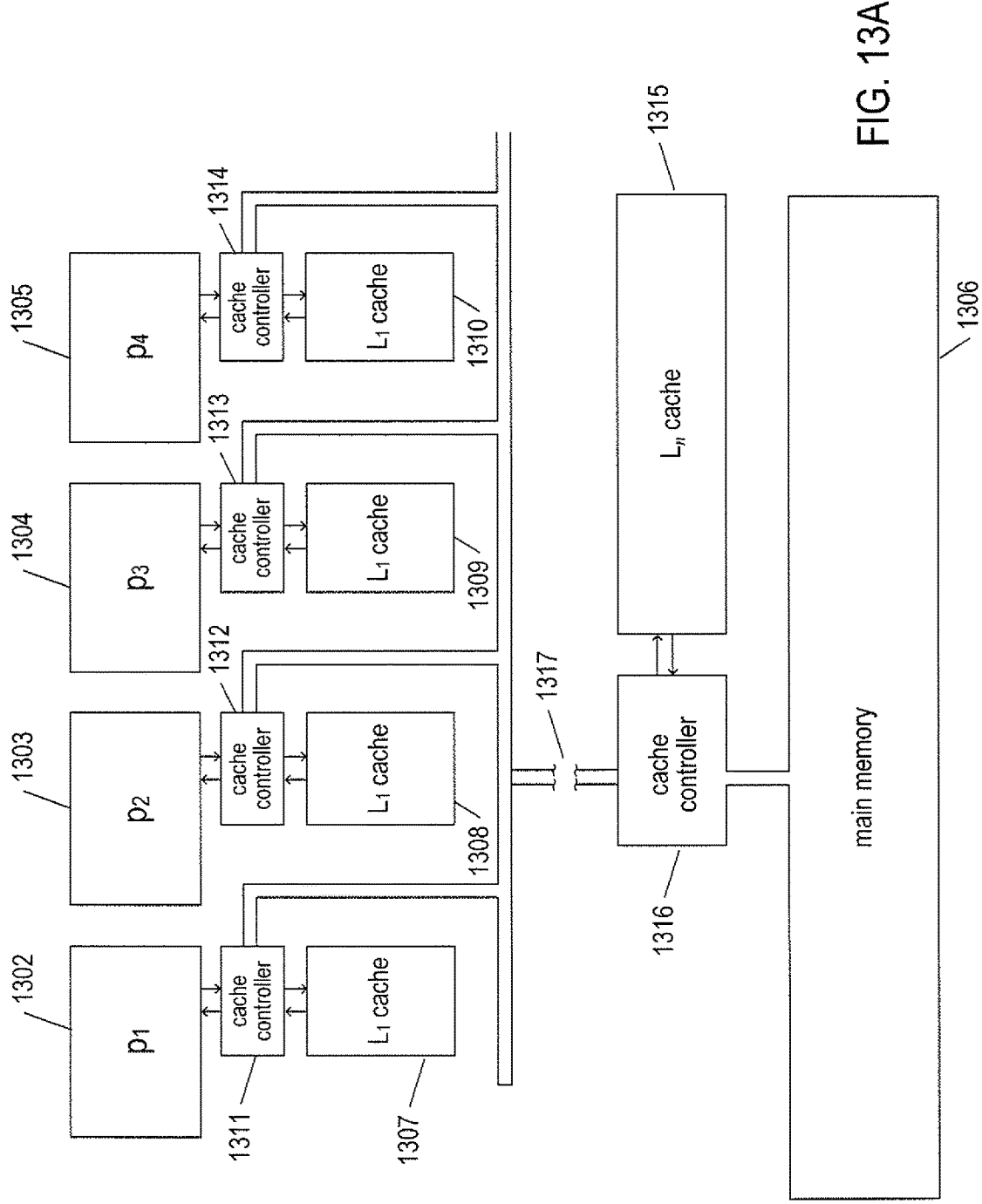
FIGS. 13A-R illustrate problems associated with shared memory in multi-processing-entity computational environments and the approaches used to ameliorate these problems in modern computing systems.
Figure 13B:
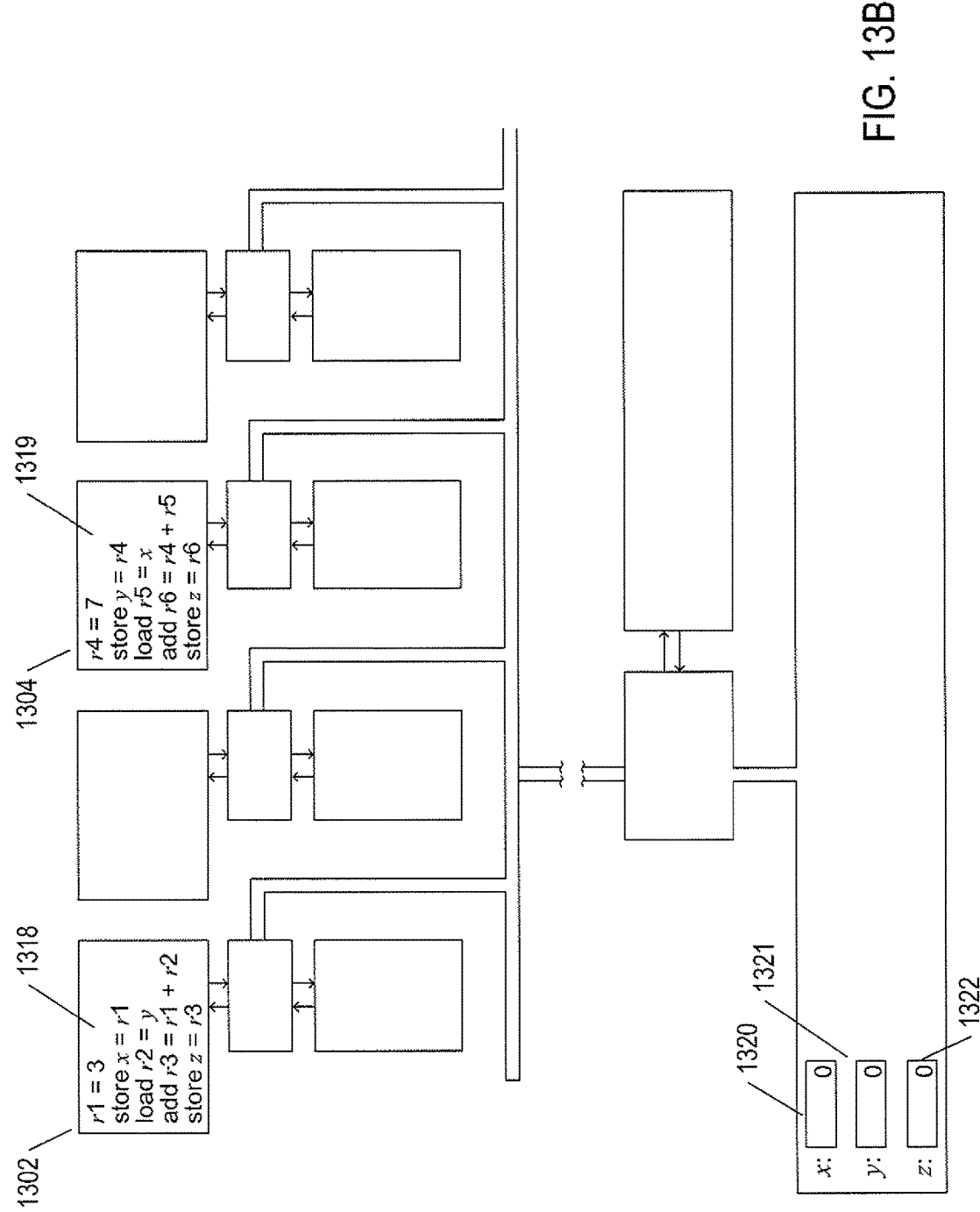
Figure 13C:
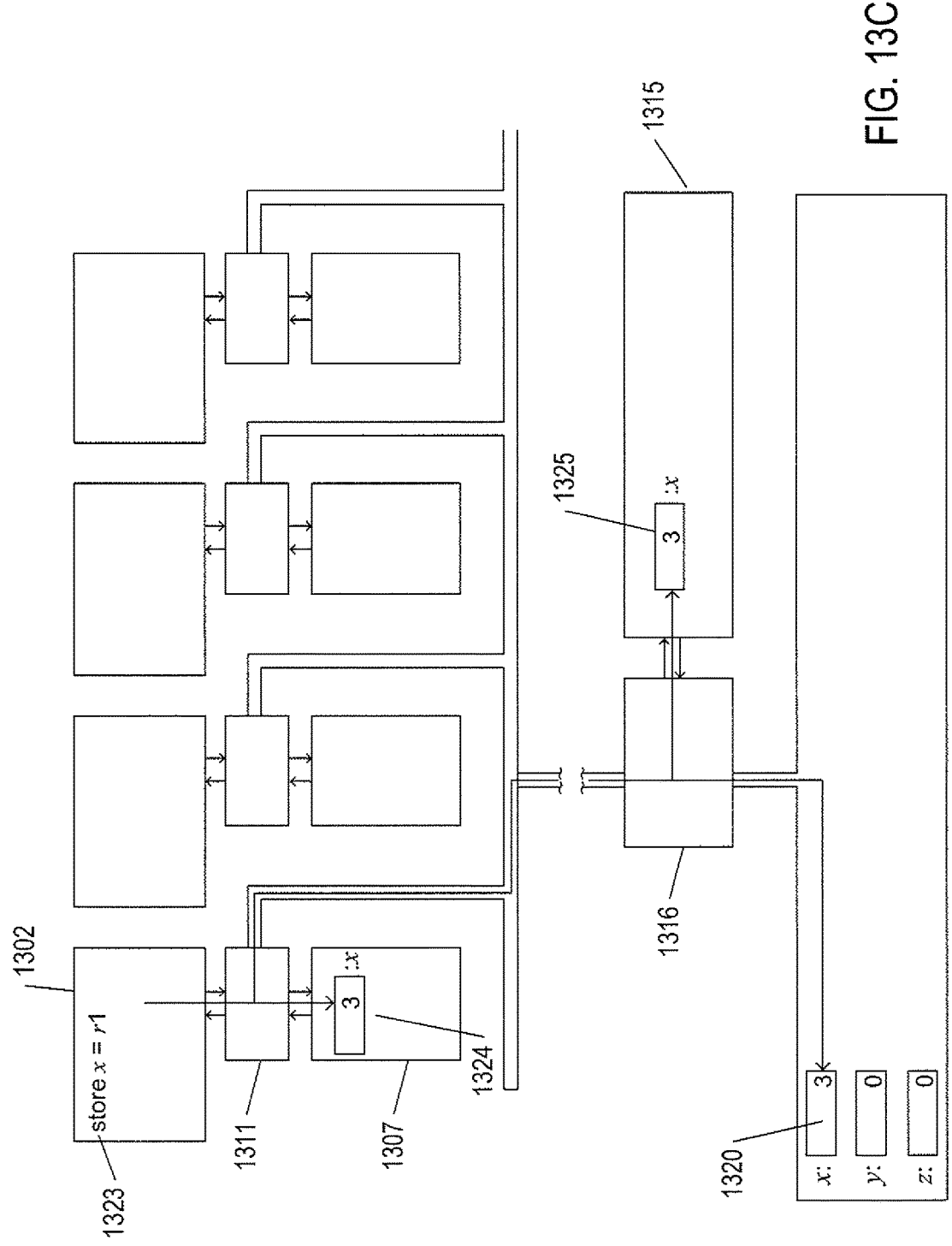
Figure 13E:
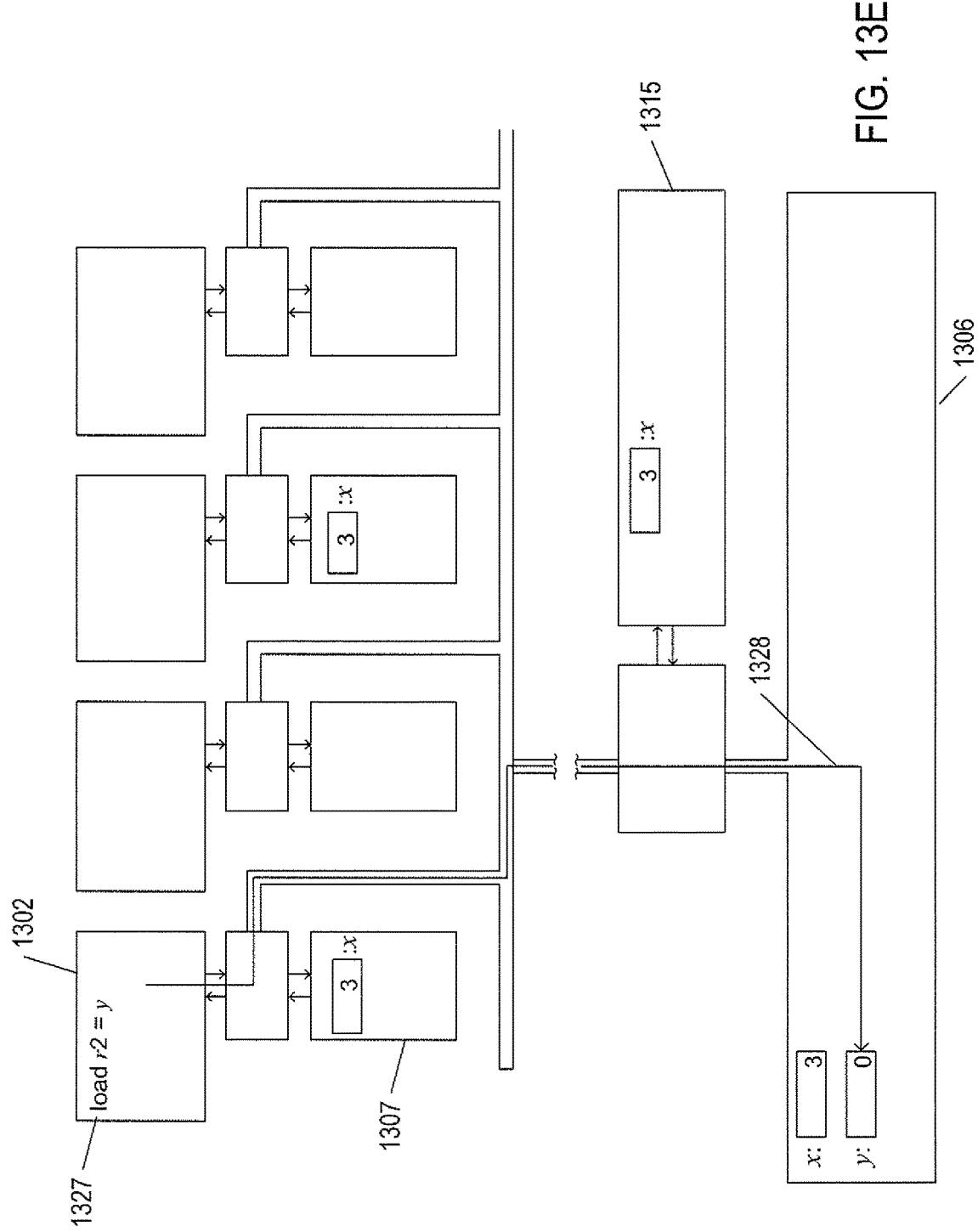
Figure 13F:
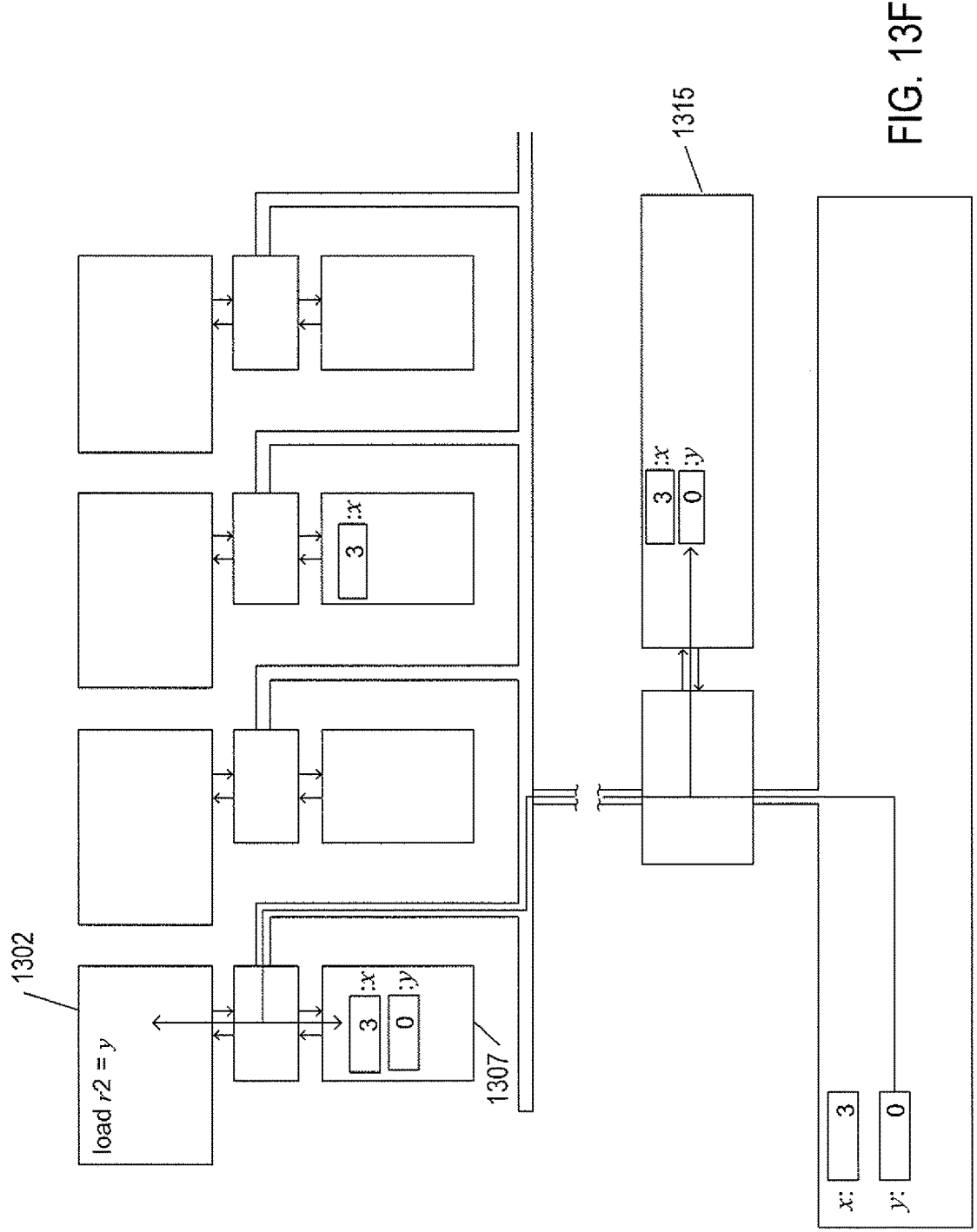
Figure 13G:
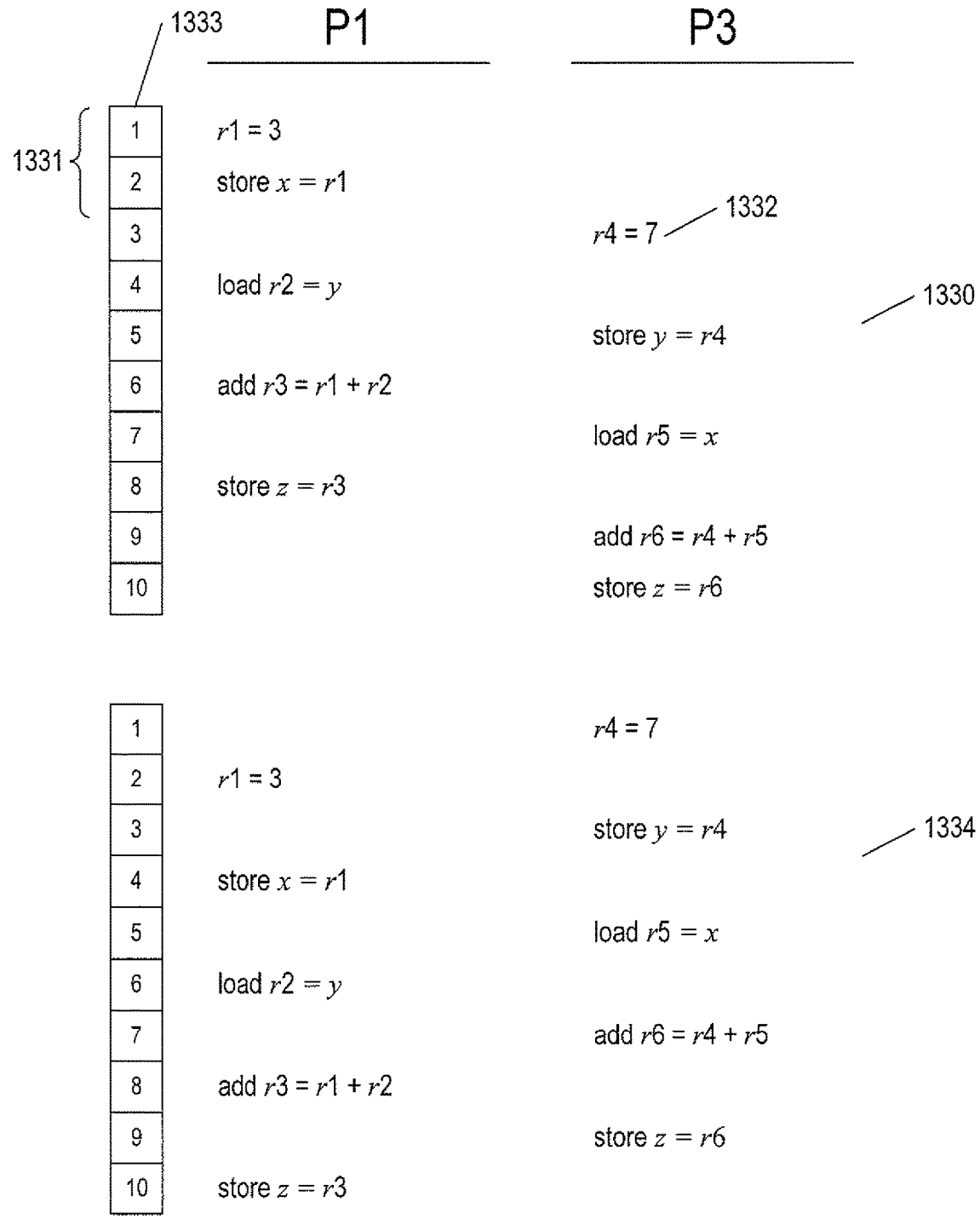
Figure 13H:
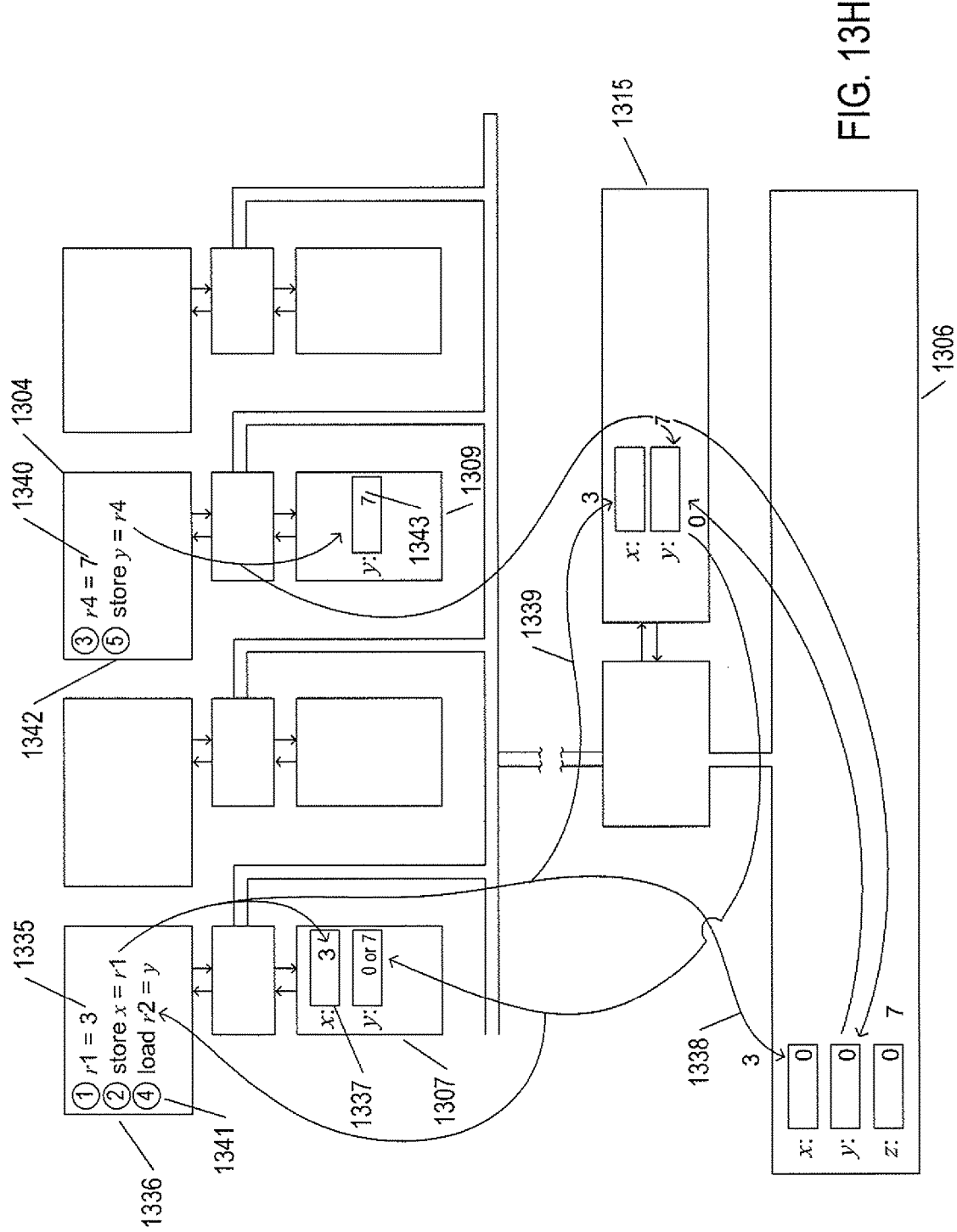
Figure 13I:
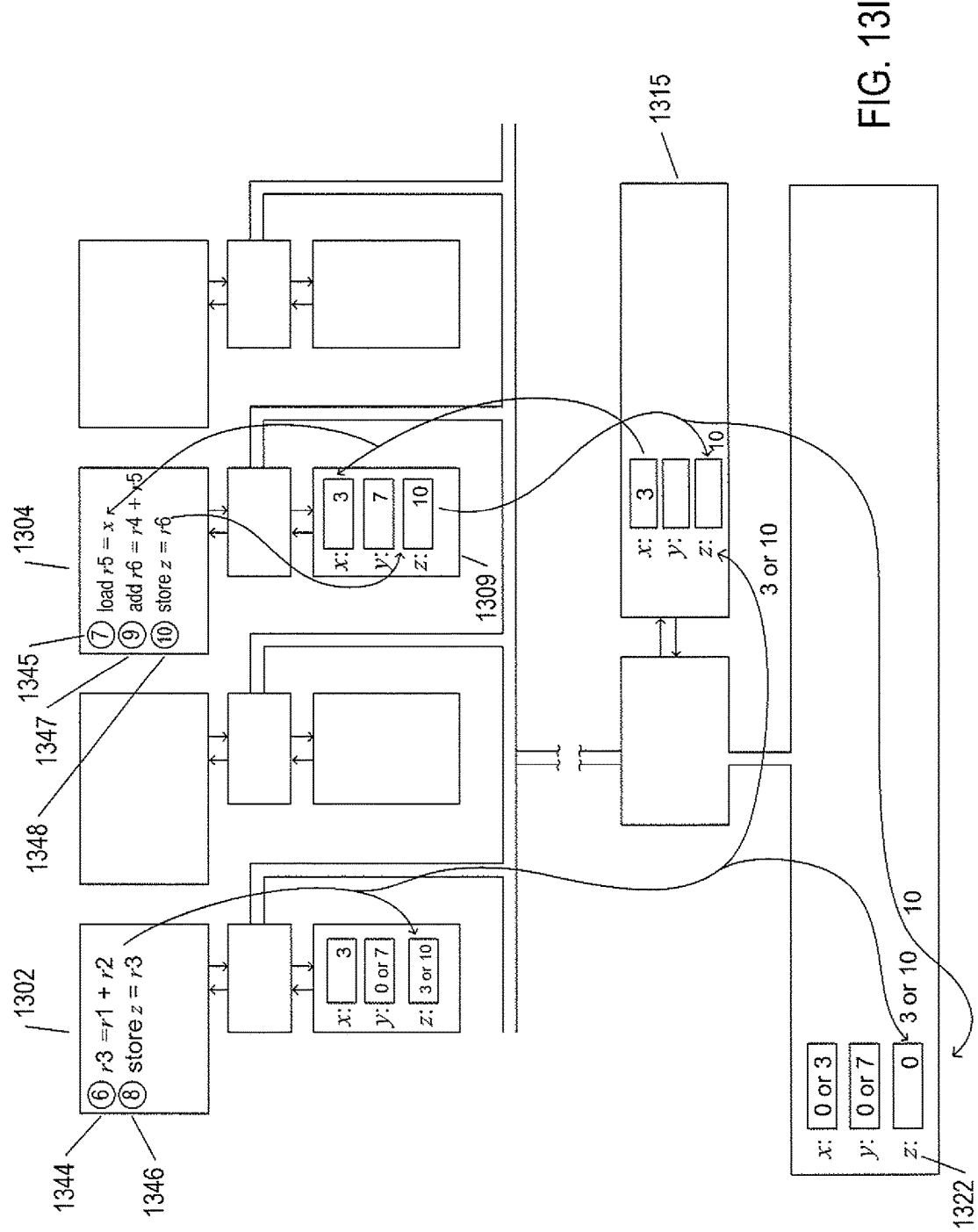
Figure 13J:
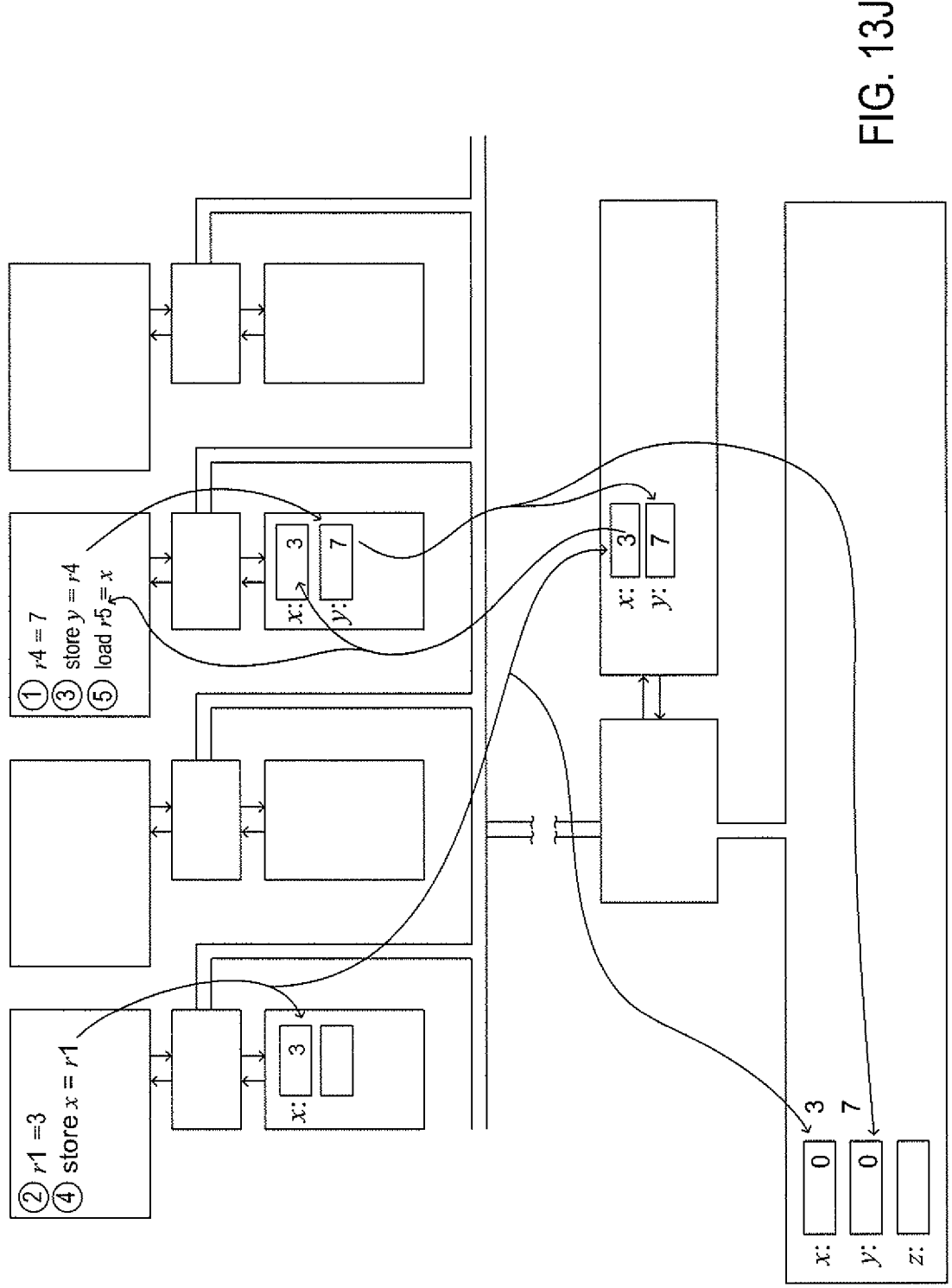
Figure 13K:
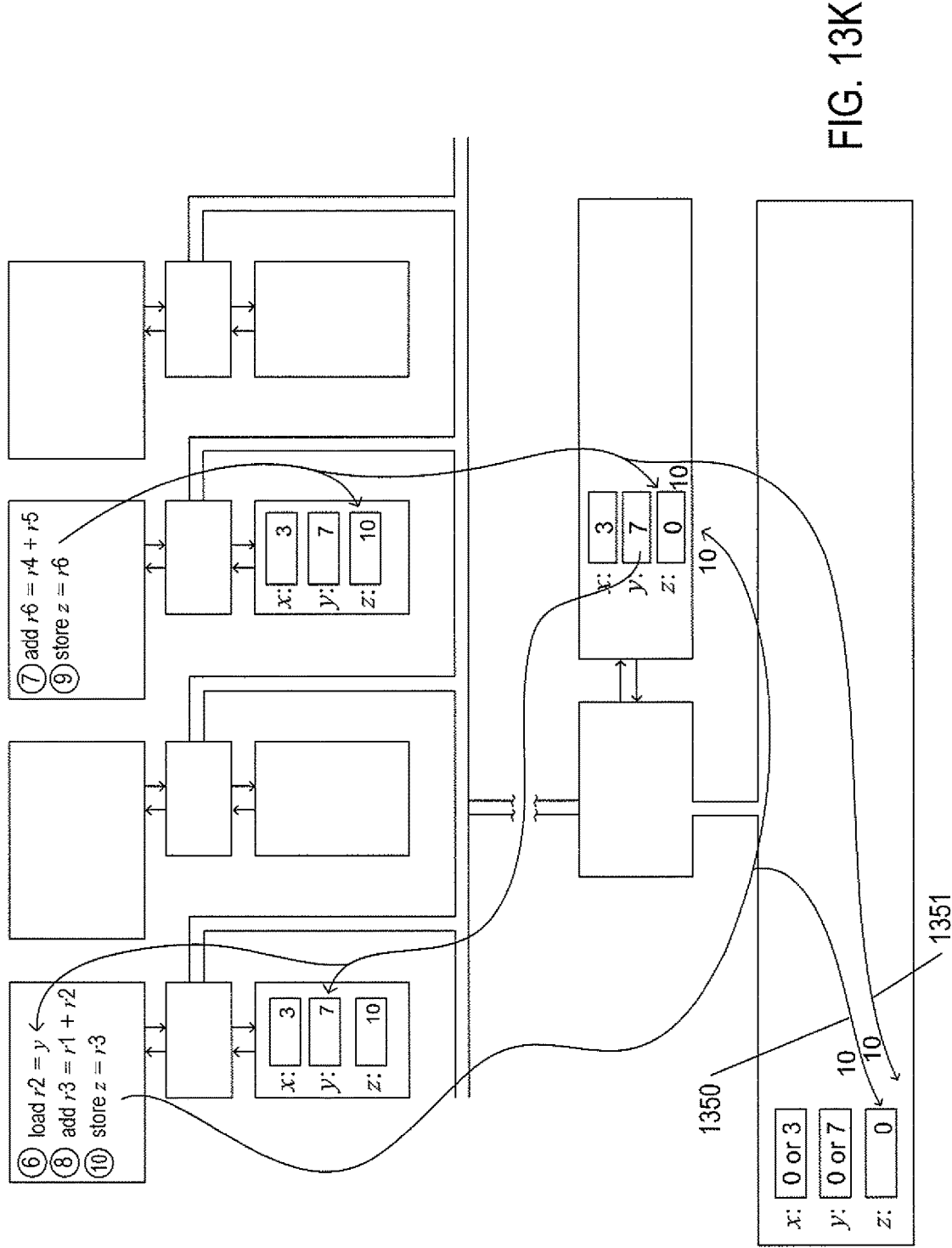
Figure 13L:
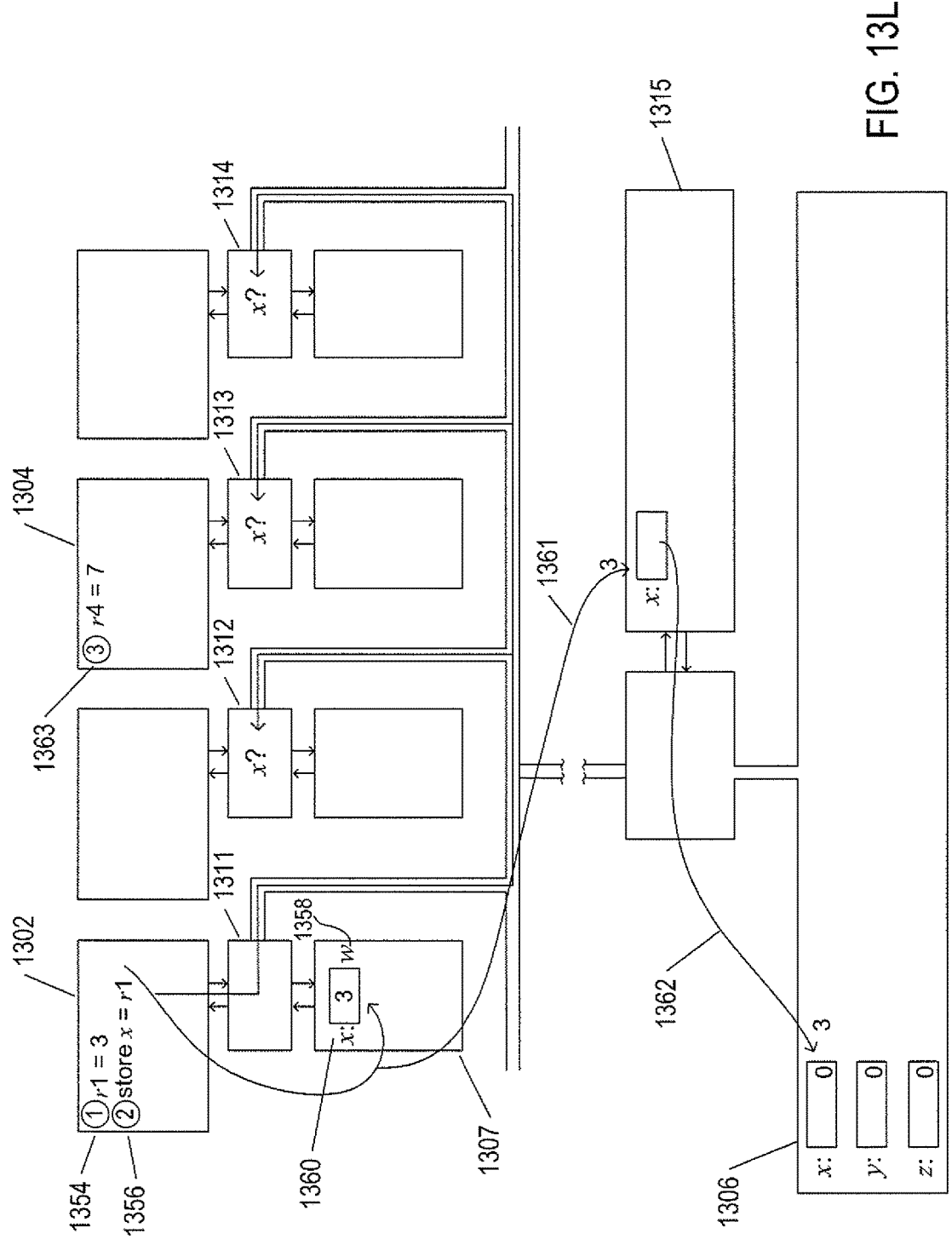
Figure 13M:
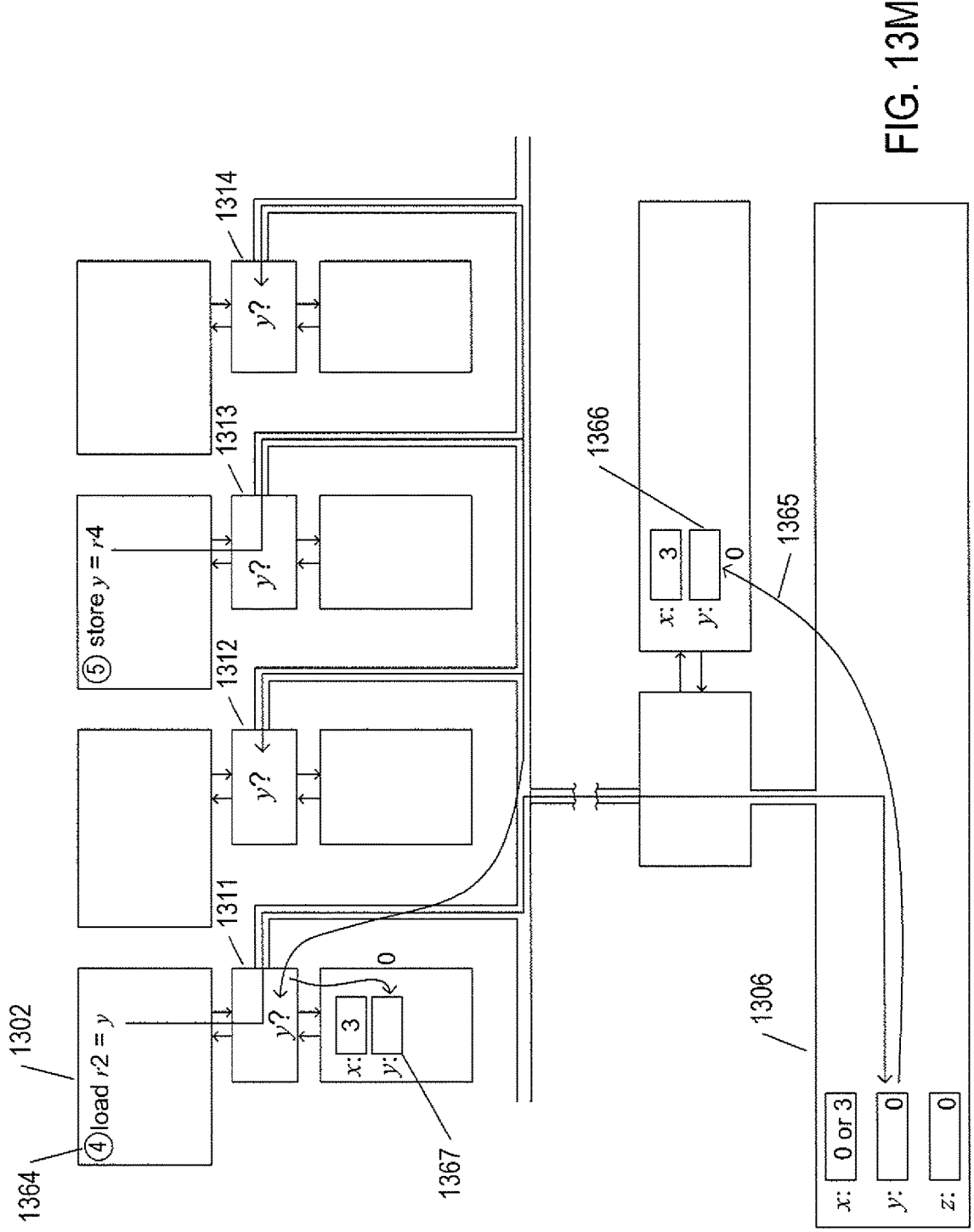
Figure 13N:
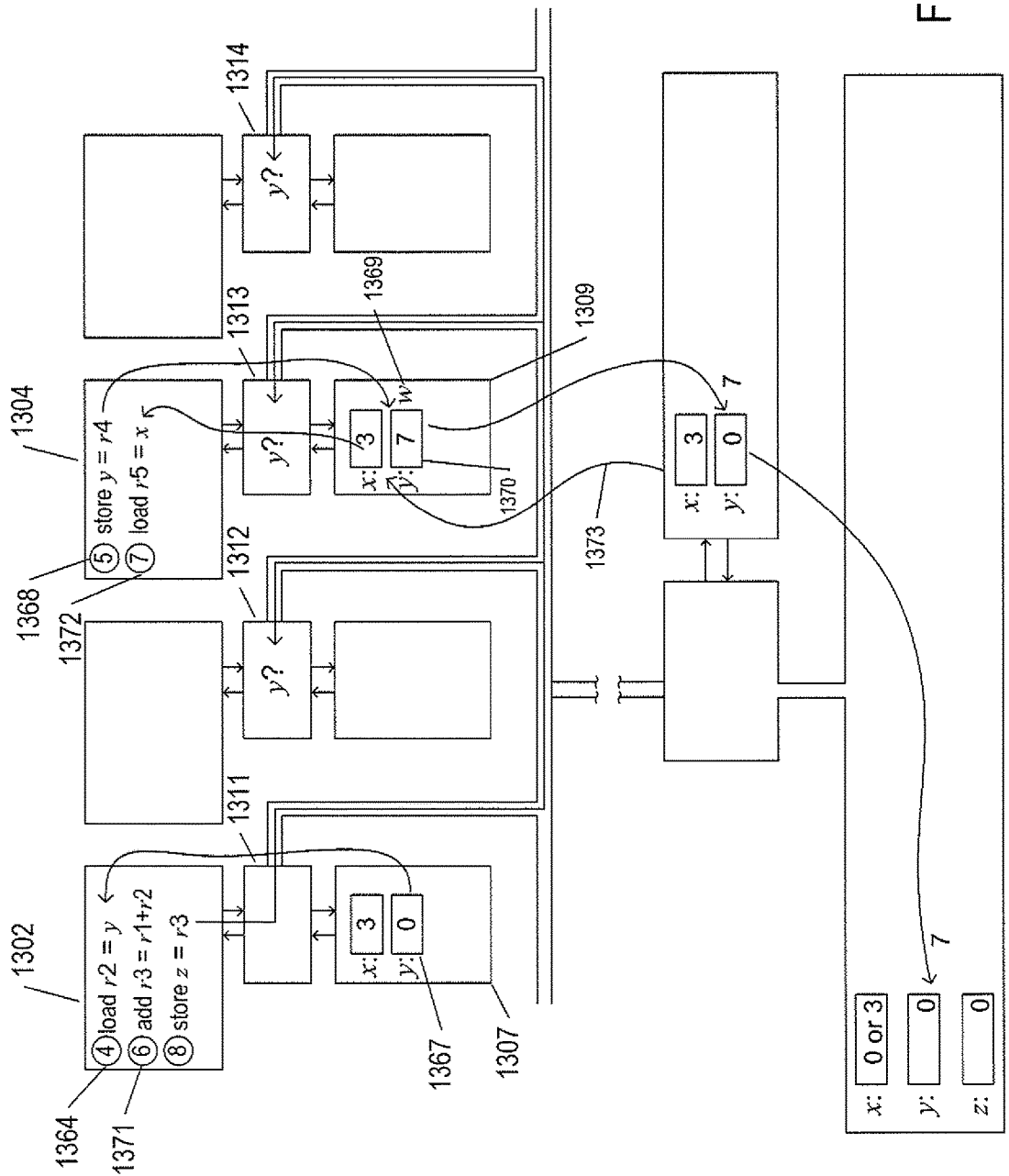
Figure 13O:
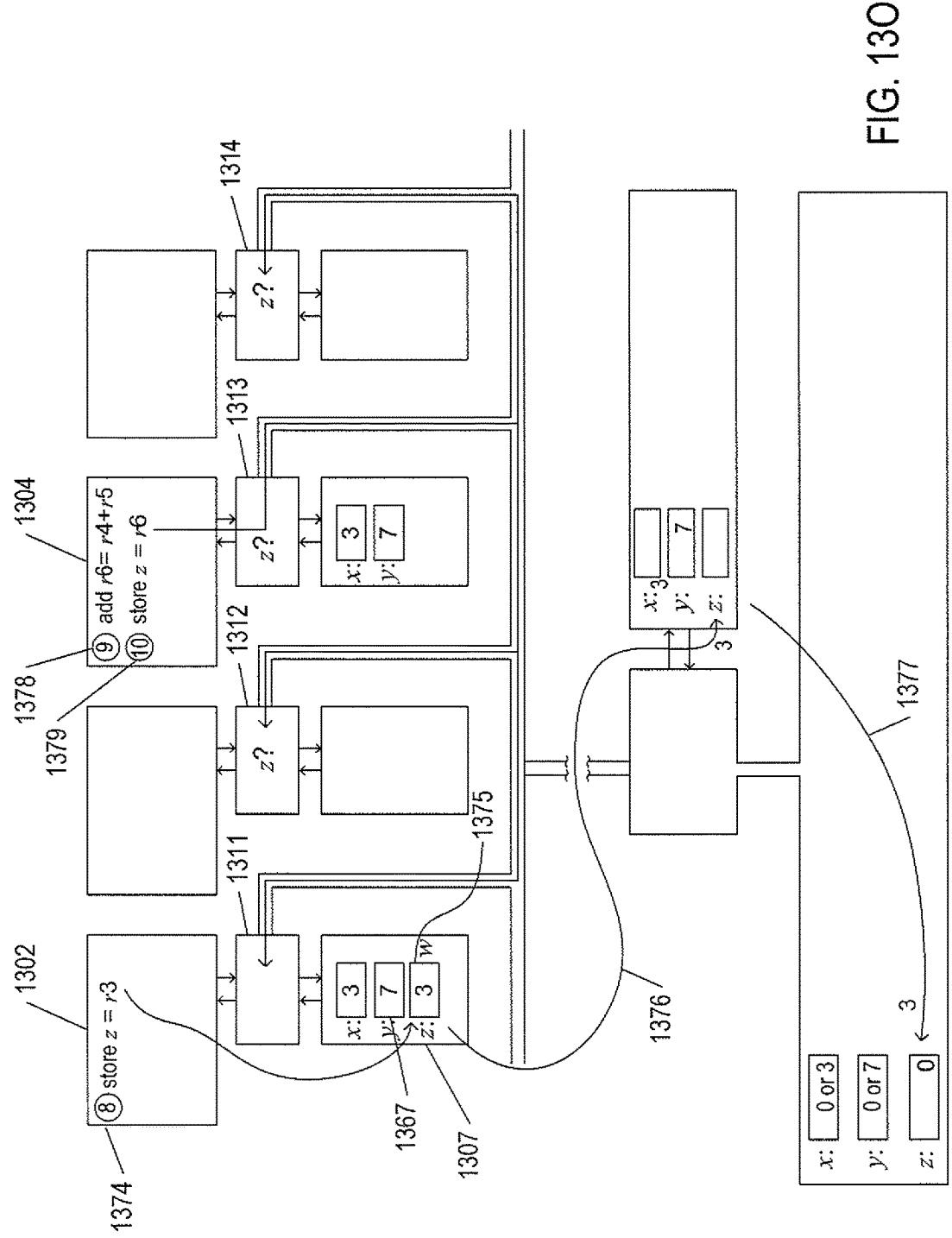
Figure 13P:
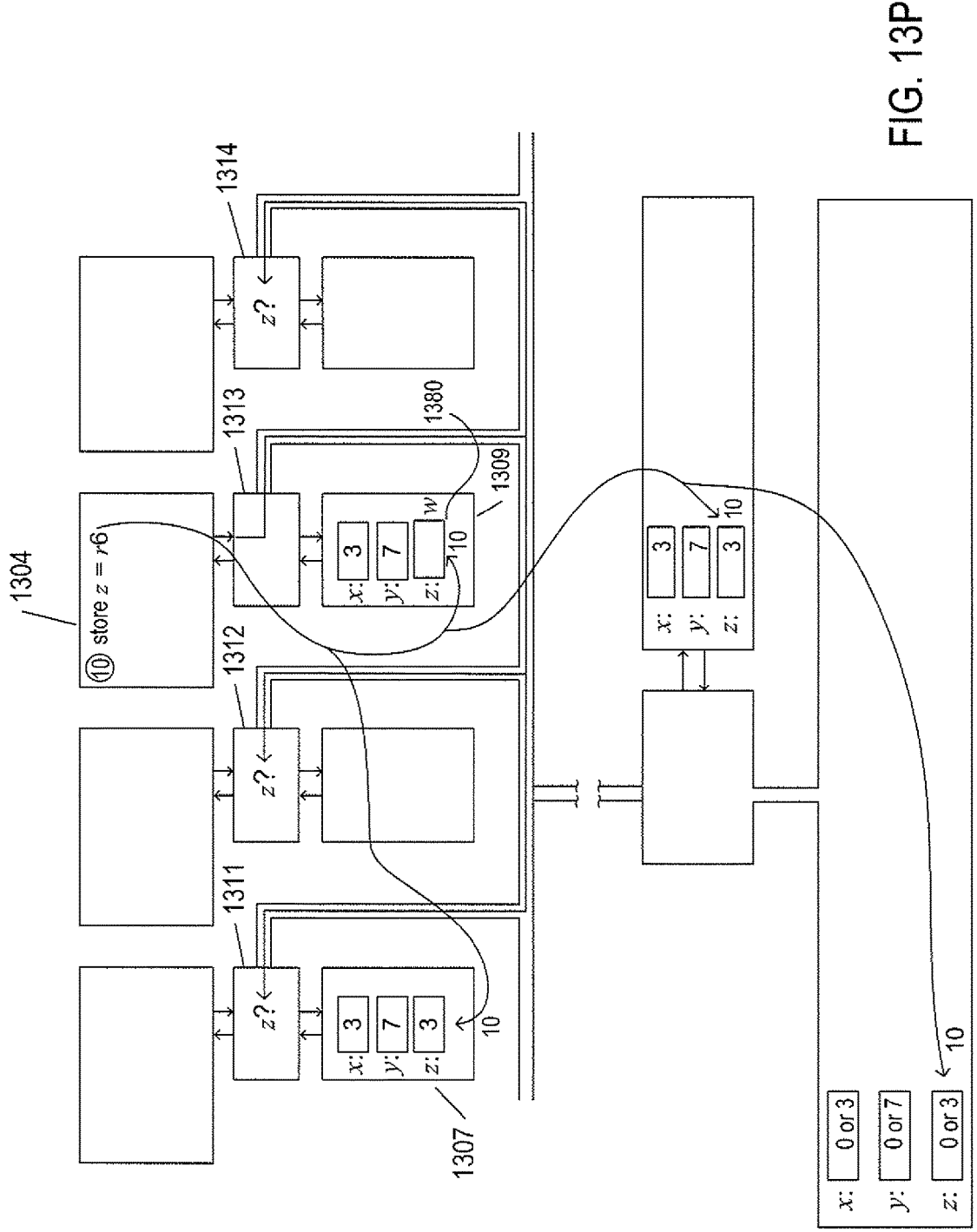

Problems Associated with Shared Memory in Multi-Processing-Entity Computational Environments FIGS. 13A-P illustrate problems associated with shared memory in multi-processing-entity computational environments and the approaches used to ameliorate these problems in modern computing systems. Although the context of the discussion of FIGS. 13A-P is hierarchical memory caches, the problem of controlling access by independently executing processes and threads to shared resources is quite general in electronics and computing, and methods used to address the problem with respect to cache-controller contention are also employed at the level of virtualization layers, operating systems, device controllers, and the hardware layer.

FIG. 13A shows a generalized multi-processing-entity computational environment that includes four processing entities 1302-1305 that access a main memory 1306 through a hierarchical system of memory caches that include a first layer of memory caches 1307-1310, referred to as "local caches," each accessed through an associated cache controller 1311-1314, respectively, and a highest-level memory cache 1315 accessed through a cache controller 1316. Each local cache is accessed only by the processing entity associated with the local cache. The broken communications pathway 1317 indicates that there may be additional levels of caches in the system. This is an example multi-processing-entity computational environment used to describe problems and associated solutions, below. Actual multi-processing-entity computational environments may include fewer or a greater number of processing entities, including cores within a multi-core processor, processors within a multiprocessor system, or both.

FIG. 13B illustrates two sets of five instructions, 1318 and 1319, to be executed by the first 1302 and third 1304 processing entities in the multi-processing-entity computational environment discussed above with reference to FIG. 13A. The two sets of instructions access three memory locations 1320-1322 that are labeled with the abstract memory-location addresses x, y, and z, respectively. Initially, all three memory locations store the numeric value 0.

Execution of the two sets of five instructions 1318 and 1319 occurs in parallel. The actual order in which the instructions are executed is generally not deterministic, but may depend on a variety of different computational-environment factors. Certain of the instructions are register instructions that do not involve access to main memory. These instructions include instructions of the type "r1=3," which stores the numeric value 3 into internal processing-entity register r1. Another register operation is the instruction "add r3=r1+r2," which adds the contents of registers r1 and r2 together and places that result in register r3. These type of instructions execute quickly within internal processing entities and are not associated with significant latencies. By contrast, the instruction "store x=r1" stores the contents of internal-processing-entity register r1 into memory location x and the instruction "load r2=y" fetches the value stored in memory location y and places it into register r2. Storing/load instructions involve cache controllers and communications-subsystem transactions and therefore involve significant latencies.

FIGS. 13C-F illustrate store and load instructions, independent of parallel-execution concerns. In FIG. 13C, the first processing entity 1302 executes a store instruction 1323. Because the local cache 1307 for processing entity 1302 does not already contain an entry for memory location x, when processing entity 1302 issues a storage request to the local-cache controller 1311, the local cache controller allocates space within the local cache and stores the value 3 in that space 1324. In addition, the local cache controller 1311 transmits a request to higher-level caches, including to highest-level cache controller 1316, which stores the value 3 in a entry for memory location x 1325 within the highest-level cache 1315 and issues a request to main memory to store the value 3 in the main-memory location x 1320. Thus, a store instruction may propagate through the cache hierarchy to main memory. In certain systems, the storage request results in only the local cache being updated, with additional updates deferred until the stored value is flushed from the local cache for one of various reasons. In other systems, the value written to local cache is immediately propagated through the cache hierarchy. Propagation through the cache hierarchy and to main memory, however, involves significant latencies.

FIG. 13D shows execution of the instruction "load r5=x" by the third processing entity 1304. The processing entity issues a fetch request to its local cache controller 1313, but the local cache does not yet contain the value for memory location x. Note that it is assumed that the local cache initially has the state shown in FIG. 13C. As a result, the local cache controller issues the fetch operation to higher-level caches. The highest-level cache 1315 contains the value 3 for memory location x, previously placed there by the store instruction executed by processing entity 1302, discussed above with reference to FIG. 13C. As a result, the highest-level cache controller 1316 returns the value 3 to the local cache controller 1313, which then writes that value to the local cache 1326 as well as returns the value 3 to processing entity 1304 for storage in register r5. Of course, were there additional cache levels, the value for memory location x would likely have been obtained from a lower-level cache. Thus, the fetch operation needs to only traverse the cache hierarchy to the point that a first stored value for memory location x is found. There is no need for this fetch to propagate to main memory when one of the caches already contains the value. By contrast, in FIG. 13E, the first processing entity 1302 executes an instruction 1327 to load the memory value y into register r2. Because neither the local cache 1307 nor the highest-level cache 1315 contains a stored value for memory location y, the fetch request propagates all the way to main memory 1306, as indicated by arrow 1328. Then, as shown in FIG. 13F, the high-level cache 1315 and the local cache 1307 are updated to contain the value 0 for memory location y as the value fetched from main memory propagates back through the cache hierarchy to the processing entity 1302. Although the local caches 1307-1310 are accessed only by their associated processing entities, multiple processing entities generally share higher-level caches. In the example multi-processing-entity environment of FIGS. 13A-R, all four processing entities 1302-1305 share the highest-level cache 1315.

The intent of caching is that the processing entities should most often need only to access their local caches, with only occasionally access to higher-level caches and main memory. This is because routines executed by processing entities often make repeated accesses to only a relatively small number of memory locations. The first access to a memory location involves accessing higher-level caches and possibly main memory, but subsequent accesses can be satisfied from locally stored values for the memory location. In many caching systems, for example, when the value is written to memory, the value may remain in a local cache or higher-level cache until some type of cache-flush operation forces the value to main memory. In these systems, the data-storage state of main memory is actually an aggregation of the states of main memory and all of the caches. Cache flushes of local caches push values to higher-level caches and flushes of the higher-level caches eventually push values to main memory. The access time for a memory location increases as the number of levels of caches need to be accessed, with the very longest access times associated with accesses that propagate all the way to main memory.

In a multi-processing-entity environment, the two sets of instructions 1318 and 1319 (see FIG. 13B) may be executed in a variety of different orders that represent various types of interleavings between the sequential order of the two instruction sets. This is because, in general, instruction execution is not synchronized between processing entities and because the latencies of instruction execution may vary tremendously on the current local and global states of the multi-processing-entity computational environment. As one example, a load instruction may execute quickly when the local cache contains the desired value but may execute quite slowly when the value needs to be retrieved from main memory. FIG. 13G shows two different possible orders of execution of the two sets of instructions 1318-1319 by processing entities 1302 and 1304. There are 10 instructions in total. In a first execution order 1330, processing entity 1302, referred to as "P1," executes its first two instructions 1331 before processing entity 1304, referred to as processing entity "P3," executes its first instruction 1332. Thus, the order of execution of the instructions is obtained from the vertical array 1333. A second possible order of instruction execution is shown in a second portion 1334 of FIG. 13G.

Next, in FIGS. 13H-K, illustration of the execution of the 10 instructions of instructions sets 1318 and 1319 are illustrated. These illustrations show execution of the 10 instructions without benefit of cache-controller communications and cache-controller contention control, to illustrate why cache-controller contention control and cache-controller communications are needed. The problems that arise, in these examples, are similar to problems that arise in many different computational contexts at many different levels and layers of a computer system.

FIG. 13H illustrates execution of the first five instructions of the ten instructions of instruction sets 1318 and 1319 according to the first overall order 1330 shown in FIG. 13G. The register instruction 1335 executes first, followed by the first store instruction 1336. The store instruction results in writing of the value 3 to a local copy of memory location x 1337 in the local cache 1307 and delayed or deferred propagation of that write to the highest-level cache 1315 and main memory 1306, as indicated by curved arrows 1338 and 1339. The register instruction 1340 next executes, followed by the load instruction 1341. The load instruction propagates all the way to main memory 1306 and returns the value 0 to highest-level cache 1315 and local cache 1307. However, as the load instruction 1341 is executing, the store instruction 1342 executes on the processing entity 1304. This store instruction writes the value 7 to memory-location-copy 1343 in local cache 1309 and begins to propagate further down to the lower cache levels. Because, in the current discussion, there is no provision for synchronizing the load and store operations between processing entities, it is now uncertain whether the value associated with memory location y in the highest-level cache 1315 is 0 or 7 and it is therefore also uncertain whether the value associated with the memory location y in local cache 1307 is 0 or 7. The value of memory location y in local cache 1307 depends on whether the 0 fetched from main memory by the load instruction 1341 makes it to the various caches prior to or after the value 7, written by store instruction 1342, propagates to the highest-level cache in main memory.

FIG. 13I illustrates execution of the final five of ten instructions of the instruction sets 1318 and 1319. The sixth instruction that is executed 1344 is a register instruction that adds the contents of registers r1 and r2. Because there was a race condition with respect to loading the value of memory location y by the first processing entity 1302 and storing a value into memory location y by processing entity 1304, as discussed above with reference to FIG. 13H, it is uncertain whether the value contained in register r2 in processor 1302 is 0 or 7. Thus, the computed sum stored in register r3 may be either 3 or 10, depending on the actual order in which caches were updated. Next, processing entity 1304 carries out load instruction 1345. This results in the value 3 being accessed from the highest-level cache 1315 and written to local cache 1309 before propagating to processing entity 1304. Next, the first processing entity 1302 executes store instruction 1346, which directs either the value 3 or 10, depending on the value contained in register r3, to be stored in memory location z. Finally, the last two instructions 1347 and 1348 are executed by processing entity 1304, resulting in processing entity 1304 attempting to store the value 10 into memory location z by executing the final instruction 1348. Again, there is a race condition between the store operations executed in instructions 1346 and 1348 by processing entities 1302 and 1304, respectively. Thus, memory location z in main memory 1322 may be set either to the value 3 or to the value 10, depending on the actual order of cache updates and other operations carried out as the instructions of instruction sets 1318-1319 are executed by processing entities 1302 and 1304.

From this example, it is clear that the presence of the multi-level cache hierarchy as well as independently executing processing entities results in nondeterministic changes to the state of both the caches and main memory. In this small example, when the ten instructions are executed according to the overall execution sequence 1330 in FIG. 13G, the value stored in memory location z may end up either being 3 or 10. In fact, the example assumed certain orderings of intermediate cache operations in this example. There may, in fact, be additional possible outcomes, depending on the overall sequence in which the various cache operations complete.

FIGS. 13J-K illustrate, in the same fashion as FIGS. 13H-I, execution of the ten instructions of instruction sets 1318-1319 in the overall execution order 1334 shown in FIG. 13G. In this case, as shown by arrows 1350 and 1351 in FIG. 13K, memory location z ultimately receives the value 10. Thus, in the second possible execution order of the ten instructions, the value stored in memory location z will ultimately be 10, rather than having an uncertain value as a result of execution in the first possible execution order, as discussed above with reference to FIGS. 13H-I for the instruction-execution sequence 1330 in FIG. 13G.

Clearly, the types of nondeterministic behavior illustrated in this simple example would not be acceptable for a multi-processing-entity computational system. Each time an identical set of routines and programs were executed in parallel by multiple processing entities, a very different outcome could be anticipated. However, to be useful, a computer system needs to be both deterministic as well as correct, regardless of the overall order of instruction execution within multiple processing entities.

FIGS. 13L-R illustrate general approaches to ameliorating the nondeterministic behavior of parallel-processing systems with hierarchical cache memories discussed above with reference to FIGS. 13A-K. FIGS. 13L-R illustrate execution of the ten instructions of the two five-instruction instruction sets 1318 and 1319 discussed with reference to FIGS. 13A-K, but additionally show the various types of contention-control mechanisms that are employed in order to ensure deterministic operation of the parallel computing system. As shown in FIG. 13L, the first processing entity executes the first register operation 1354 and the second store instruction 1356. When the store instruction is executed, the local-cache controller 1311 for the local cache 1307 communicates with the remaining cache controllers 1312-1314 to determine whether or not their respective caches contain a value for memory location x. In alternative systems, local cache controller 1311 may send a query to a cache directory, which keeps track, in a centralized location, of the states of the local memory caches. In addition, the local cache controller 1311 requests exclusive access to memory location x. In the current case, because the remaining local caches 1312-1314 do not contain values from memory location x, either they mutually agree, or a cache director decides, to grant exclusive or write access to memory location x, indicated in FIG. 1311 by the small w 1358 that labels the local copy 1360 of memory location x and local cache 1307. In the case that another cache contained a value for memory location x, that value would be returned by one of the other cache controllers to local cache 1311. Local cache controller 1311 also directs the value 3 for memory location x, as indicated by arrow 1361, to the highest-level cache 1315, with the value ultimately potentially directed, as indicated by arrow 1362, to main memory 1306. In many systems, the value 3 would be directed, with significant latency, to main memory. In other systems, values tend to remain in the lowest-level caches until they are flushed, in order to make room for other values, in which case they percolate upward to higher-level caches and, ultimately, main memory. Various types of system and processor events may result in cache flushes, in which all or a significant portion of the values in a cache are flushed upward to higher-level caches and, ultimately, main memory. There are a variety of different general methods and techniques for cache control. As also shown in FIG. 13L, the second processing entity 1304 carries out register instruction 1363.

As shown in FIG. 13M, once the second store instruction (1356 in FIG. 13L) has finished execution, write access is relinquished by the local cache controller 1311. This also involves communication with other cache controllers or with the centralized directory. Then, the fourth load instruction 1364 is issued by the first processing entity 1302. First, local cache controller 1311 inquires whether any of the remaining cache controllers 1312-1314 currently maintain a value for memory location y in their respective caches. Because none of the cache controllers contain a value for memory location y, cache controller 1311 issues a request to the higher-level caches that is ultimately propagated to main memory 1306. The value 0 is returned, as indicated by arrow 1365, to the highest-level cache, where a copy of the value is stored 1366 and ultimately returns to local cache controller 1311, which also stores a value for memory location y 1367.

As shown in FIG. 13N, once the value 0 has been stored by the local cache controller 1311 into a copy of the current value of memory location y 1367 in local cache 1307, the value is returned to processing entity 1302 to allow for completion of the load instruction 1364. Next, the third processing entity 1304 executes the fifth store request 1368. In order to write a value to the memory location y, cache controller 1313 communicates either with the remaining cache controllers, as shown in FIG. 13N, or with a directory service to determine whether any of the other local caches contains a value for memory location y. In this case, cache controller 1311 responds affirmatively, sending the stored value 0 from memory location y back to cache controller 1313. In addition, either the remaining cache controllers or the directory service agrees to provide cache controller 1313 with exclusive access to memory location y, indicated by the "w" symbol 1369 next to a local copy 1370 of memory location y in cache 1309. Subsequently, as shown in FIG.

13O, the local copy 1367 of memory location y in cache 1307 is updated to contain the current value 7 written to memory location y by execution of store instruction 1368 of FIG. 13N. Returning to FIG. 13N, the first processing entity 1302 executes the register instruction 1371 and the third processing entity 1304 executes the seventh load instruction 1372 to load the value of memory location x into register r5. Because the local cache does not contain a value for memory location x, the cache controller obtains a value from a higher-level cache, as represented by arrow 1373. In other types of systems, the local cache controller might instead fetch the value from local cache controller 1311.

Next, as shown in FIG. 13O, the first processing entity 1302 executes the eighth store instruction 1374. In a first step, local cache controller 1311 queries the remaining cache controllers 1312-1314 to see whether any of the other local caches contain a value for memory location z. Because they do not, and because all of the cache controllers mutually agree to grant exclusive access to memory location z to cache controller 1311, cache controller 1311 stores the value 3 into a local copy 1375 of memory location z in local cache 1307. The value 3 is additionally propagated, as indicated by arrows 1376 and 1377, to the higher-level caches and to main memory. Then, the third processing entity 1304 executes register operation 1378 followed by the tenth store instruction 1379. As shown in FIG. 13P, execution of the tenth store instruction 1379 again involves communication between local cache controller 1313 and the remaining cache controllers 1311-1312 and 1314. In this case, because a value for memory location z is stored in cache 1307, the communication involves surrendering exclusive access to that memory location by cache controller 1311, establishing exclusive access to memory location z on behalf of cache controller 1313, and directing the value 10, currently stored in register r6 in the third processing entity 1304 to be written to the value for memory location z and cache 1307, to a copy of memory location z 1380 in local cache 1309, and to higher-level caches and, ultimately, main memory. In the end, following completion of the last instruction, memory location z will eventually have the value 10.

There are many different strategies and types of contention control used within hierarchical-memory-cache-based multi-processing-entity systems. Some use centralized directories, others rely on messages passing between controllers, some employ write-through caching while other deploy deferred writes, and many other details may vary between different types of systems. In general, contention control seeks to impose deterministic outcomes, at least with respect to a given overall order of instruction execution within the multiple processing entities. Contention control involves the ability to gain exclusive access to memory locations, by processing entities, in order to carry out write operations without the danger of race conditions with respect to multiple writes to a given memory location. In general, whatever the mechanism, a consistent view of memory is sought to be maintained within the low-level caches. Contention control does involve locking and serialization. When a local cache controller has exclusive access to a particular memory location, access to that memory location becomes serialized, as a result of which forward progress of other processing entities that need to access the memory location may be blocked. A consistent view of memory may necessarily involve a significant decrease in the amount of parallel execution within the system and a corresponding decrease in overall computational bandwidth.

Figure 13R:
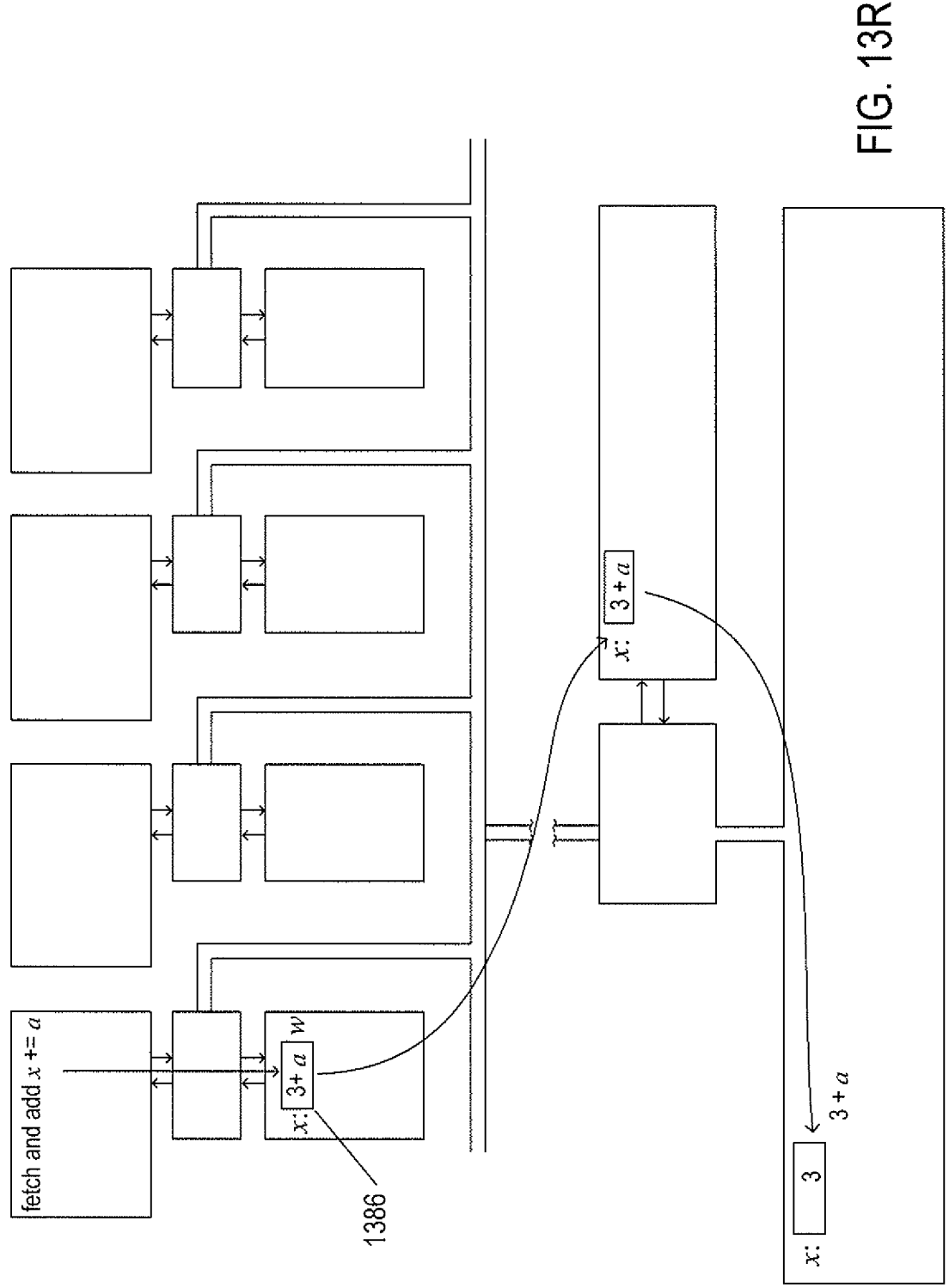

FIGS. 13Q-R illustrate an atomic fetch-and-add instruction. A fetch-and-add instruction retrieves the value of a memory location and writes an updated value to the memory location in one indivisible execution. This is similar to a test-and-set instruction or a compare-and-swap instruction, which are used to implement various synchronization objects and methods, including semaphores and mutexes. Not only is the fetch-and-add instruction atomic within a processing entity that executes it, execution of a fetch-and-add instruction also involves addressing potential contention within the hierarchical caches of a hierarchical-cache-based multi-processing-entity system. As shown in FIG. 13Q, using the same illustration conventions as used in FIGS. 13A-P, execution of a fetch-and-add instruction 1384 involves first communicating with a centralized directory or with other cache controllers to obtain an exclusive access to the memory location to which the fetch-and-add instruction is directed. In FIG. 13Q, local copy 1386 of memory location x is obtained, with exclusive access, as a result of the communications with other controllers or with a centralized directory and fetching the value of memory location x from a higher-level cache or main memory. Then, the local copy memory location x is updated to include the most recent value for memory location x. In the example shown in FIG. 13Q, this involves fetching the value from memory location x 1320 in main memory 1306. Next, as shown in FIG. 13R, while exclusive access is maintained on the local copy of memory value x, a new value, in this case the value 3+a, is written to the local copy 1386 of memory value x and, in those systems that feature write-through semantics, is directed to higher-level caches and main memory. Thus, a fetch-and-add instruction guarantees that the memory location to which it is directed will be exclusively accessed to return the value stored in that memory location, without interference by any other executing entity, and that a new value will be written to the memory location prior to relinquishing exclusive access.

The Storage Stack to which the Current Document is Directed

Figure 14A:
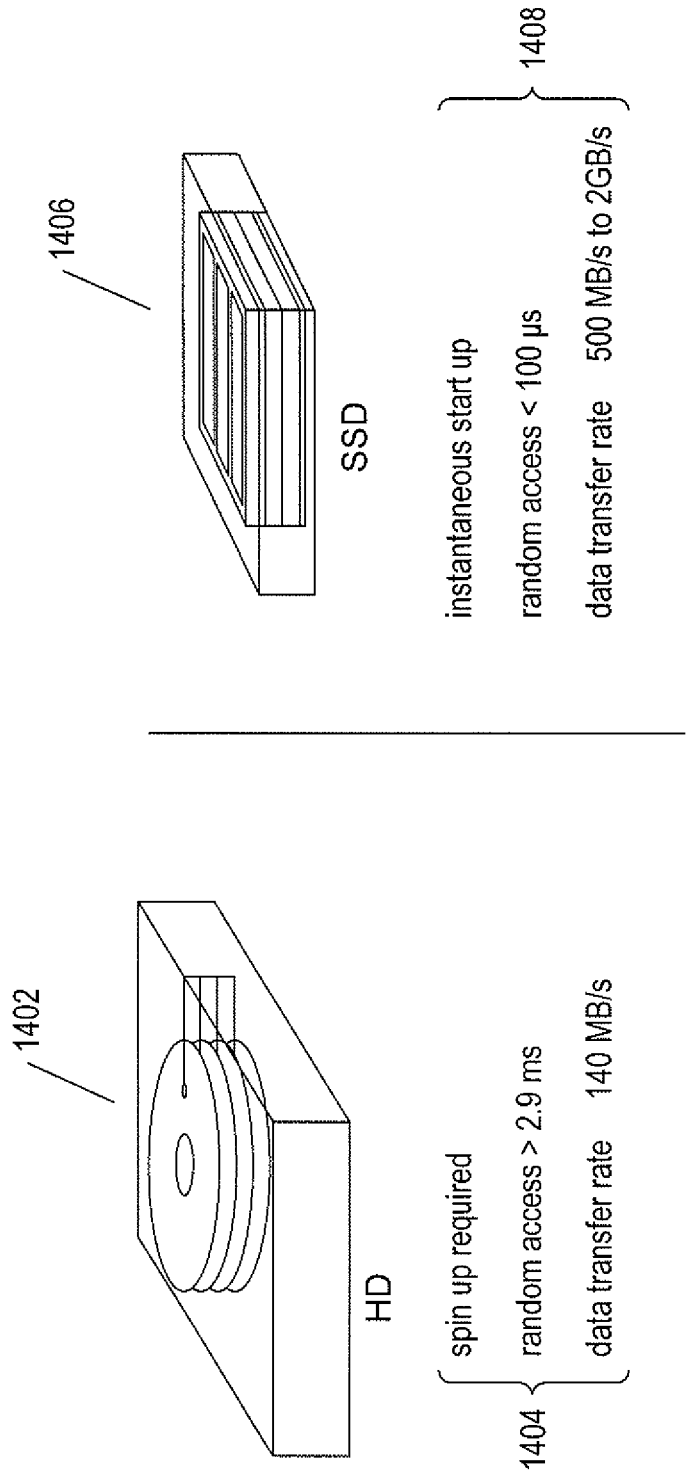
FIGS. 14A-C illustrate an example of a new, high-throughput I/O device that is connected to a host computer system through a high speed communications medium.
Figure 14B:
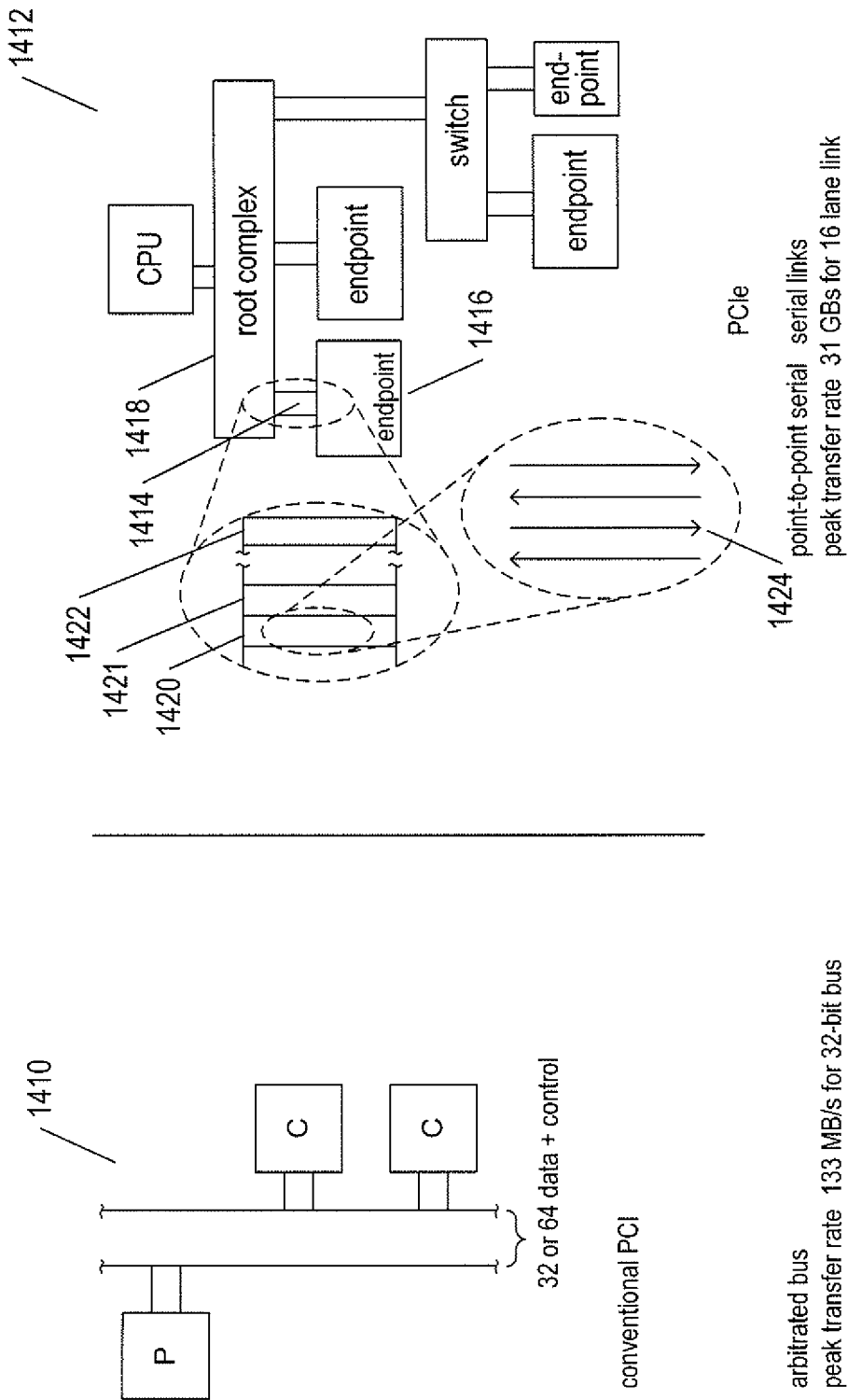
Figure 14C:
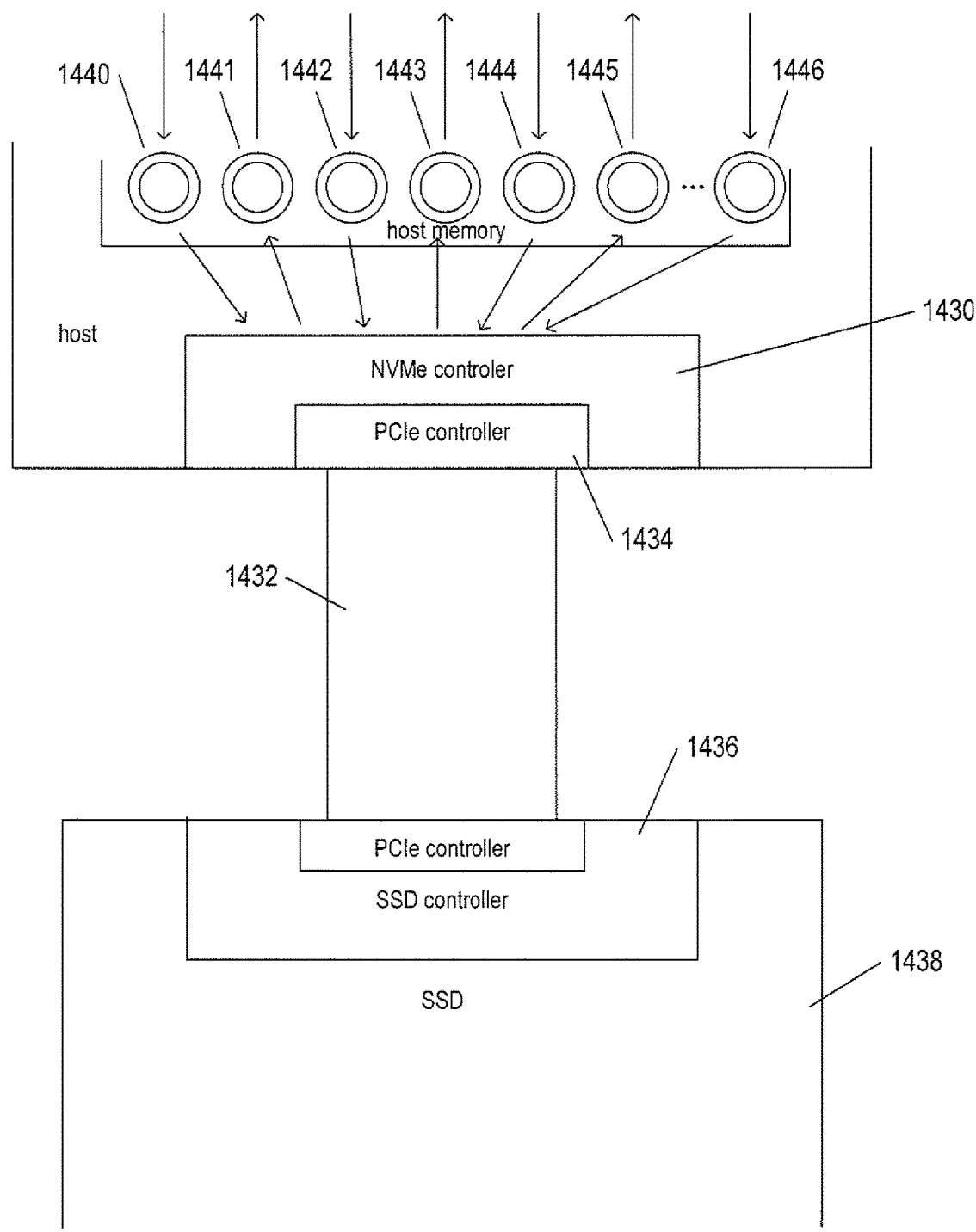

FIGS. 14A-C illustrate an example of one type of high-throughput I/O device that is connected to a host computer system through a high speed communications medium. The high-throughput I/O device is referred to as a solid-state drive ("SSD"). Solid-state drives are modern data-storage devices with electronic interfaces similar to block I/O magnetic disk drives. However, while magnetic disk drives employ mechanically spun platters for magnetically storing data in small regions of a thin-film ferromagnetic material, the direction of magnetization of which are set by magnetic disk-write operations executed by magnetic heads arranged along a movable actuator arm, SSDs are non-mechanical devices that use non-volatile electronic memory for storing data. Magnetic disks 1402 include processor-based disk controllers, multiple platters with ferromagnetic coatings, a multi-arm actuator, each arm including multiple magnetic heads for accessing the data-storage regions on the surface of the platters, a high-speed electric motor, power-distribution circuitry, and other electromagnetic components. They are complicated devices and are associated with many types of failure modes, from deterioration of the ferromagnetic films on the platters to actuator alignment errors and electronic-motor failures. As listed 1404 in FIG. 14A, magnetic drives are associated with significant spin-up latencies, when powered on, have random-access times of greater than 2.9 ms, and have maximum data-transfer rates of about 140 MB per second. By contrast, SSDs 1406 feature 1408 instantaneous start up, random-access times of less than 100

μs, and data-transfer rates of between 500 MB per second to 2 GB per second. Both magnetic disks and SSDs have similar data-storage capacities, but magnetic disk drives are significantly cheaper per unit of stored data. Nonetheless, SSDs have begun to penetrate and even take over many data-storage-device markets because of their higher reliability and much greater data-transfer rates.

The large data-transfer rates of SSDs would be difficult to realize in computer systems without high-speed communications media to interconnect SSDs with host processors and host memory. Older arbitrated-bus-based communications media do not have sufficient data-transfer bandwidths to take advantage of the data-transfer rates of SSDs. However, the newer peripheral component interconnect express ("PCIe") communications technology provides the data-transfer bandwidth to allow host computers to take full advantage of SSDs. FIG. 14B compares the older peripheral component interconnect ("PCI") technology with the newer PCIe technology. PCI 1410 is an arbitrated bus with 32 or 64 signal lines for data transfer plus additional control signal lines. The peak data-transfer rate for the PCI is about 133 MB per second for a 32-bit bus. By contrast, the newer PCIe communications medium 1412 is a much higher-speed interconnection technology based on dedicated, point-to-point serial links, rather than a shared, arbitrated bus. A link 1414 between an endpoint 1416 and a root complex 1418 includes one or more lanes 1420-1422. Each lane is composed of two differential signal-line pairs 1424. A link 1414 is a point-to-point bi-directional serial connection. PCIe is inherently scalable, because the point-to-point links can have one, two, four, eight, 16 or other numbers of lanes, a doubling of the lanes providing an approximately doubling of the data-transfer rate of the link. A 16-lane PCIe link has a peak data transfer rate of 31 GB per second. Thus, a combination of SSDs and PCIe can provide much higher data-transfer rates than traditional disk drives and arbitrated-bus-based interconnections between disk drives and host memory and processors. Thus, PCIe/SSD technology can significantly increase the data-transfer throughput for I/O subsystems within a computer system, when properly incorporated into the computer-system.

FIG. 14C illustrates a non-volatile memory express ("NVMe") host controller. The NVMe express host controller has been developed in order to facilitate incorporation of SSDs and other high-throughput I/O data-storage devices with host computers. The NVMe controller 1430 is implemented by an NVMe chip set incorporated into an expansion card that interfaces to a PCIe communications medium 1432 through an internal PCIe controller 1434. The PCIe communications medium 1432 interconnects the NVMe controller with an SSD controller 1436 of an SSD 1438. The NVMe accesses a number of generally paired submission and completion queues 1440-1446 in host memory to provide parallel, simultaneous access to the SSD by multiple processor cores or multiple processors in a multi-processing-entity computational environment. SSDs are capable of a high degree of parallel operation which is exploited by the NVMe controller via the multiple submission and completion queues and parallel processing of I/O requests.

The I/O scheduling components of the block layer of a storage stack, discussed above with reference to FIG. 11, carry out a variety of queuing and dequeuing operations, temporarily store I/O requests in order to reorganize the I/O requests within I/O-requests batches prior to forwarding the I/O-requests batches to storage device controllers, and employ a variety of methods to intelligently distribute I/O requests among input queues of host interfaces to data-storage devices in order to minimize I/O-request-execution latency. In other words, the I/O scheduling components incur significant computational overheads and introduce significant latencies in storage-stack processing of I/O requests in order to achieve greater latency reductions by intelligent scheduling and distribution of I/O requests. The introduced latencies include the cache-controller-contention-amelioration methods discussed in the previous subsection as well as similar contention-amelioration methods employed at the operating system, virtualization-layer, and storage-stack levels, including methods to regulate contention for queues. The trade-off in incurred vs. decreased latencies is generally quite favorable for magnetic-disk data-storage devices and other relatively low-throughput data-storage devices, but may be less favorable and even unfavorable for newer, higher-throughput data-storage devices, including SSDs interfaced to NVMe host controllers. The current document is directed to methods and systems that preserve I/O scheduling for low-throughput data-storage devices but that selectively bypass I/O scheduling for the newer, higher-throughput data-storage devices when the cost of I/O scheduling exceeds the latency reductions provided by I/O scheduling.

FIGS. 15A-F illustrate one implementation of the storage stack that represents an example of the methods and systems for increasing the data-transfer throughput of I/O subsystems within computer systems to which the current document is directed. FIG. 15A again shows a storage stack, similar to the storage stack previously illustrated in FIG. 11, discussed above in the first subsection of this document. In addition to the components of the storage stack shown in FIG. 11, the storage stack shown in FIG. 15A includes a short-circuit switch 1502 and a latency monitor 1504. The latency monitor monitors the I/O-request-execution latency associated with high-throughput data-storage devices, such as an SSD, and uses the latency information to control operation of the short-circuit switch 1502. When the I/O-request-execution latency for a high-throughput data-storage device remains below a threshold latency, I/O requests received from the stacked-devices layer 1506 are routed around the block layer 1508 directly to the high-throughput data-storage devices 1510 and 1511 or, in certain implementation, to either the SCSI mid layer 1512, SCSI low-level drivers 1513, or another storage-stack layer lower than the block layer. However, when the average latency for I/O-request execution for a high-throughput data-storage device rises to or above the threshold value, then I/O requests received from the stacked-devices layer 1506 and directed to the high-throughput data-storage device are forwarded to the block layer 1508, so that the I/O scheduling mechanisms within the multi-queue block I/O component 1509 of the block layer 1508 can be employed to intelligently reorganize the I/O request stream and distribute I/O requests in order to decrease I/O-request execution latencies for the device. In general, the short-circuit switch 1502 can short-circuit I/O request propagation only to high-throughput data-storage devices, such as SSDs interfaced to NVMe device controllers. I/O requests directed to traditional data-storage devices, such as hard disks, pass through the short-circuit switch to the block layer 1508 for traditional scheduling-based processing.

Figure 15A:
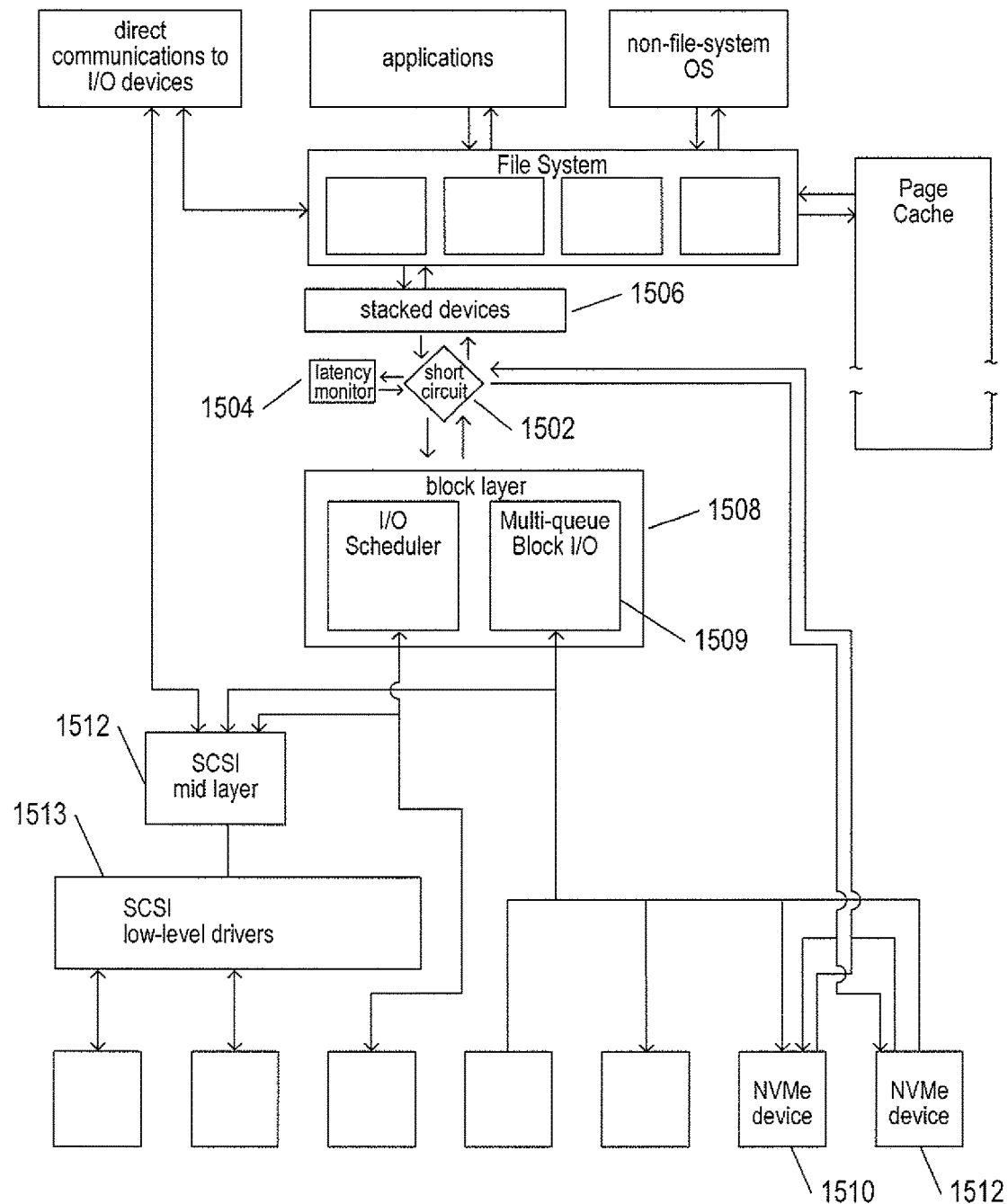
FIGS. 15A-F illustrate one implementation of the storage stack that represents an example of the methods and systems for increasing the data-transfer throughput of I/O subsystems within computer systems to which the current document is directed.
Figure 15B:
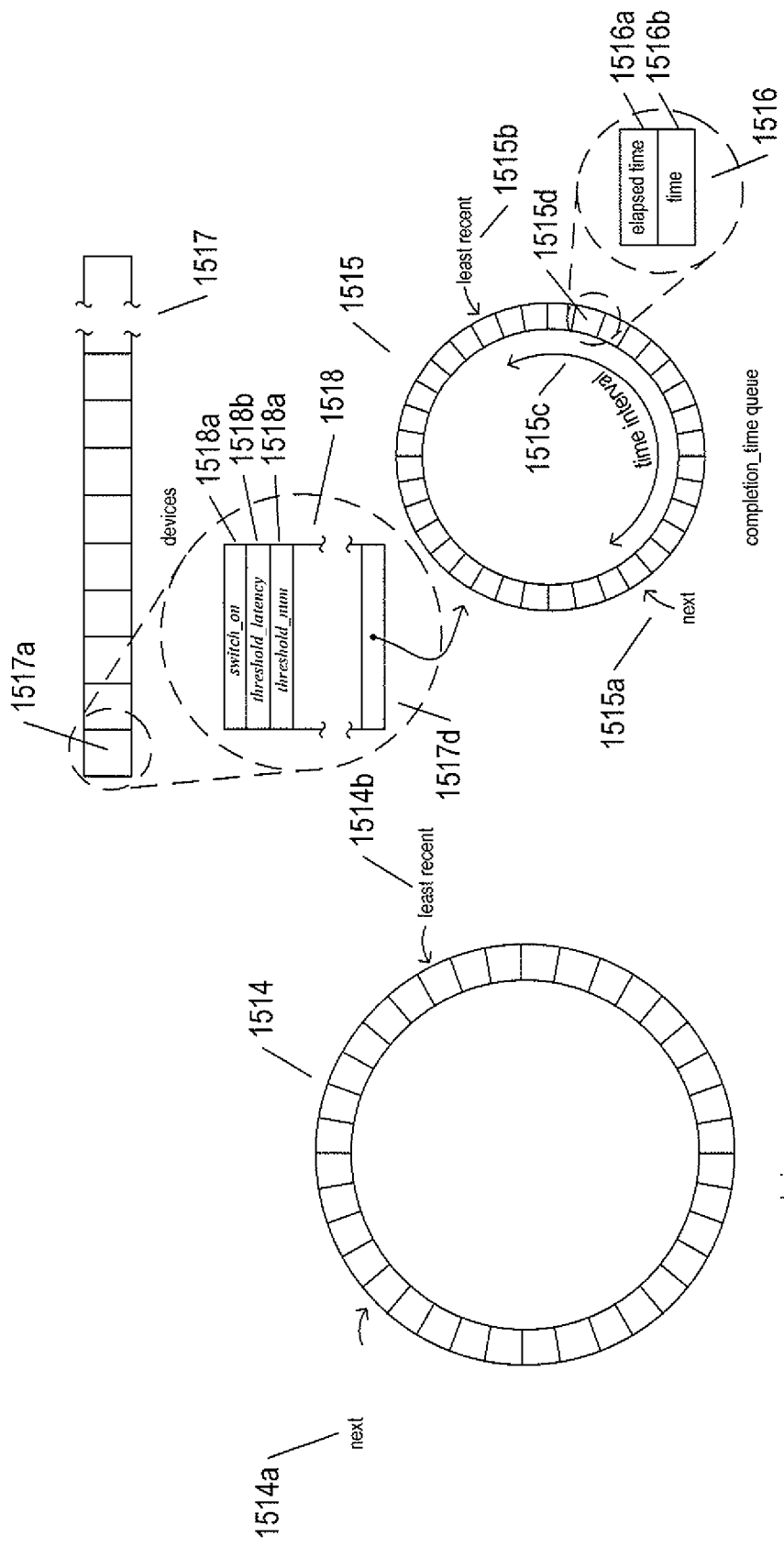

FIG. 15B shows several data structures that is used in an implementation subsequently described with reference to control-flow diagrams, provided in FIGS. 15C-F, that illustrate an implementation of the latency monitor and short-circuit switch included in the storage stack discussed above with reference to FIG. 15A. A first data structure 1514 is a commands_in_progress queue, implemented as a circular queue with a next pointer 1514*a* that indicates the free entry into which to store a next I/O request and a least_recent pointer 1514*b* that indicates the least recently received I/O request still resident in the commands_in_progress queue. The commands_in_progress queue stores the I/O requests that are currently pending. Many systems may not use a commands_in_progress queue, but may instead include logic to access pending I/O requests within the various input and output queues in which they currently reside. A second data structure 1515, the completion_time queue, is also a circular queue with next 1515*a* and least_recent 1515*b* pointers. The entries in the completion_time queue are associated with a time interval 1515*c* that extends from the current time back to a previous time, with the length of the time interval a constant or parameter associated with the latency monitor. Each entry in the completion_time queue, such as entry 1515*d*, is a data structure 1516 that includes an elapsed time value 1516*a* for a complete I/O request and a time 16516*b* at which the entry was queued. The completion_time queue is merely one possible implementation of a mechanism to store data with which to monitor I/O-request execution times for each high-throughput data-storage device. A third data structure 1517*a*, the devices array, includes an element, such as element 1517*a*, for each high-throughput data-storage device. The devices-array entry 1518 includes: (1) a Boolean switch_on value 1518*a*, indicating whether or not the short circuit is currently operating to short-circuit scheduling mechanisms within the block layer, (2) a threshold_latency value 1518*b*, indicating a minimum elapsed-time-for-completion value that is considered to be indicative of a greater-than-desirable I/O-request-execution latency, (3) a threshold_num value 1518*c* indicating a minimum number of computed I/O-request-execution times stored in completion_time-queue entries within the time interval that triggers setting the switch_on value to FALSE, in order to discontinue short-circuiting of scheduling mechanisms within the block layer, and (4) a reference to the completion_time queue associated with the device represented by the devices-array entry. Additional and/or different information may be stored in the devices-array entry 1518, in alternative implementations. In certain implementations, data structures for monitoring I/O-request-execution latency may be associated with groups of high-throughput data-storage devices, rather than with each high-throughput data-storage device. In other implementations, data structures for monitoring I/O-request-execution latency may be collectively associated with all of the high-throughput data-storage devices, rather than with each high-throughput data-storage device.

Figure 15C:
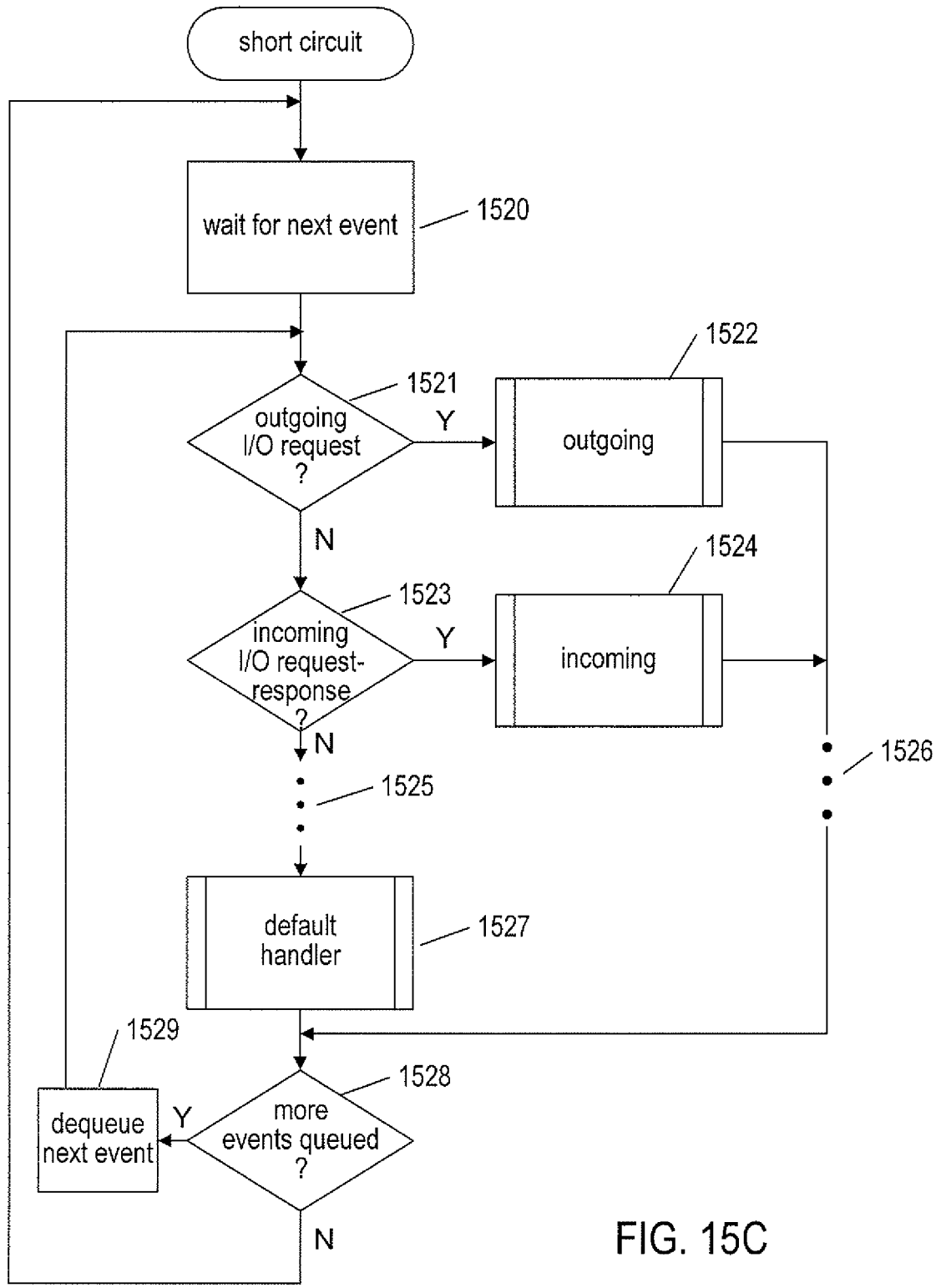

FIGS. 15C-F provide control-flow diagrams to illustrate implementation of the latency monitor and short-circuit bypass switch discussed above with reference to FIG. 15A. These flow-control diagrams assume maintenance of a devices array containing device data structures (1518 in FIG. 15B). FIG. 15C shows a flow-control diagram for the short-circuit component and latency monitor. The short-circuit component essentially comprises a continuously executing event-handling loop. In step 1520, the short-circuit component waits for a next event to occur. When the next-occurring event is reception of an I/O request for transmission to lower levels of the storage stack, referred to as an "outgoing I/O request," as determined in step 1521, an outgoing handler is called in step 1522. Otherwise, when the next-occurring event is an I/O-request completion obtained from a device controller, referred to as an "incoming I/O-request response," as determined in step 1523, an incoming handler is called in step 1524. Ellipses 1525-1526 represent the fact that other events may be handled by the short-circuit component. A default handler 1527 may be called to handle unexpected or rare events. When there are more events queued for handling, having arrived during handling of a previously received event, as determined in step 1528, a next event is dequeued, in step 1529, and control flows back to step 1521. Otherwise, control flows back to step 1520, where the short-circuit component waits for the occurrence of a next event.

The short-circuit component receives incoming I/O-request responses directly from the host interfaces for the high-throughput device controllers. In certain implementations, the short-circuit component may dequeue I/O-request responses from completion queues and, when the short-circuit component is not in bypass mode, may forward those I/O request responses to the block layer or to higher stack layers. In other implementations, the short-circuit component may receive interrupts or other notifications and first evaluate I/O-request responses without dequeuing them, so that the I/O-request responses which the short-circuit component chooses not to forward to higher stack layers remain on the queues for subsequent dequeuing by other storage-stack components. The interface between the short-circuit component and lower levels of the storage stack are generally operating-system dependent, virtualization-layer dependent, and/or data-storage-device dependent.

Figure 15D:
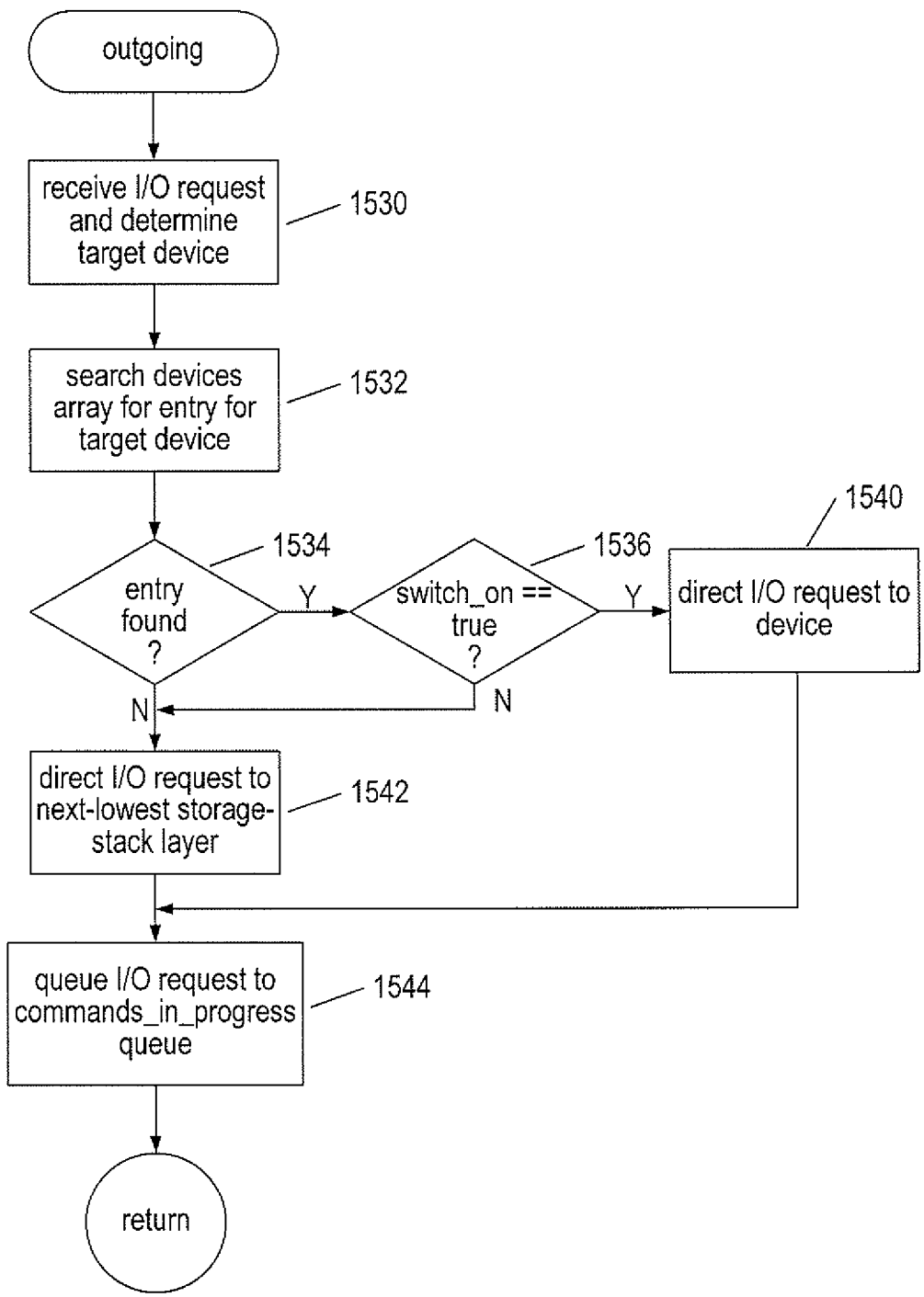

FIG. 15D provides a control-flow diagram for the outgoing handler, called in step 1522 of FIG. 15C. In step 1530, the outgoing handler receives the I/O request, or a reference to the I/O request, and determines the target device to which the I/O request is directed. In step 1532, the outgoing handler searches the devices array for an entry corresponding to the target device. When an entry is found, as determined in step 1534, and when the switch_on value in the entry is TRUE and the short-circuit component is therefore operating in bypass mode, as determined in step 1536, the outgoing handler directs the I/O request to the target device, or to a level of the storage stack below the block layer 1508 of FIG. 15A, in step 1540. Otherwise, in step 1542, the outgoing handler directs the I/O request to a next-lowest storage-stack layer, generally the block layer 1508 of FIG. 15A. Finally, in step 1544, the outgoing handler queues the I/O request to the commands_in_progress queue, in those implementations in which copies of the I/O request are stored by the short-circuit bypass switch.

Figure 15E:
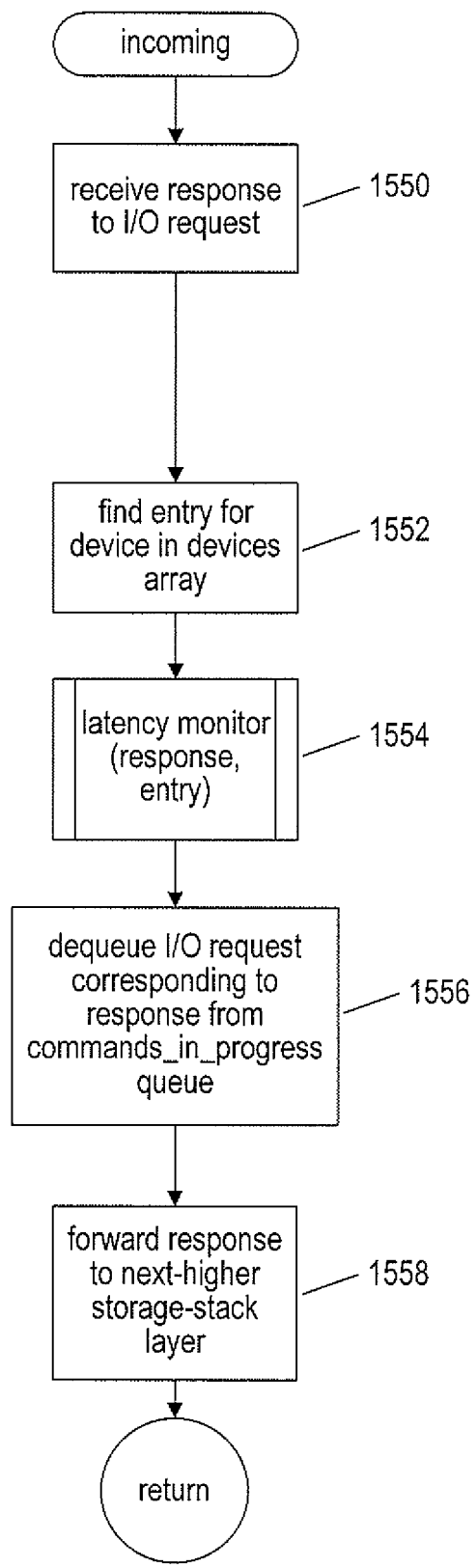

FIG. 15E provides a control-flow diagram for the incoming handler, called in step 1524 of FIG. 15C. In step 1550, the incoming handler receives the response to the I/O request, or a reference to the response to the I/O request. In step 1552, the incoming handler searches the devices array for an entry corresponding to the device from which the response to the I/O request was received. In step 1554, the incoming handler calls a routine "latency monitor," which implements the latency-monitor functionality. In step 1556, the incoming handler dequeues the I/O request corresponding to the received response from the commands_in_progress queue, in those implementations in which copies of the I/O request are stored by the short-circuit bypass switch. Finally, in step 1558, the incoming handler directs the I/O request to a next-highest storage-stack layer.

Figure 15F:
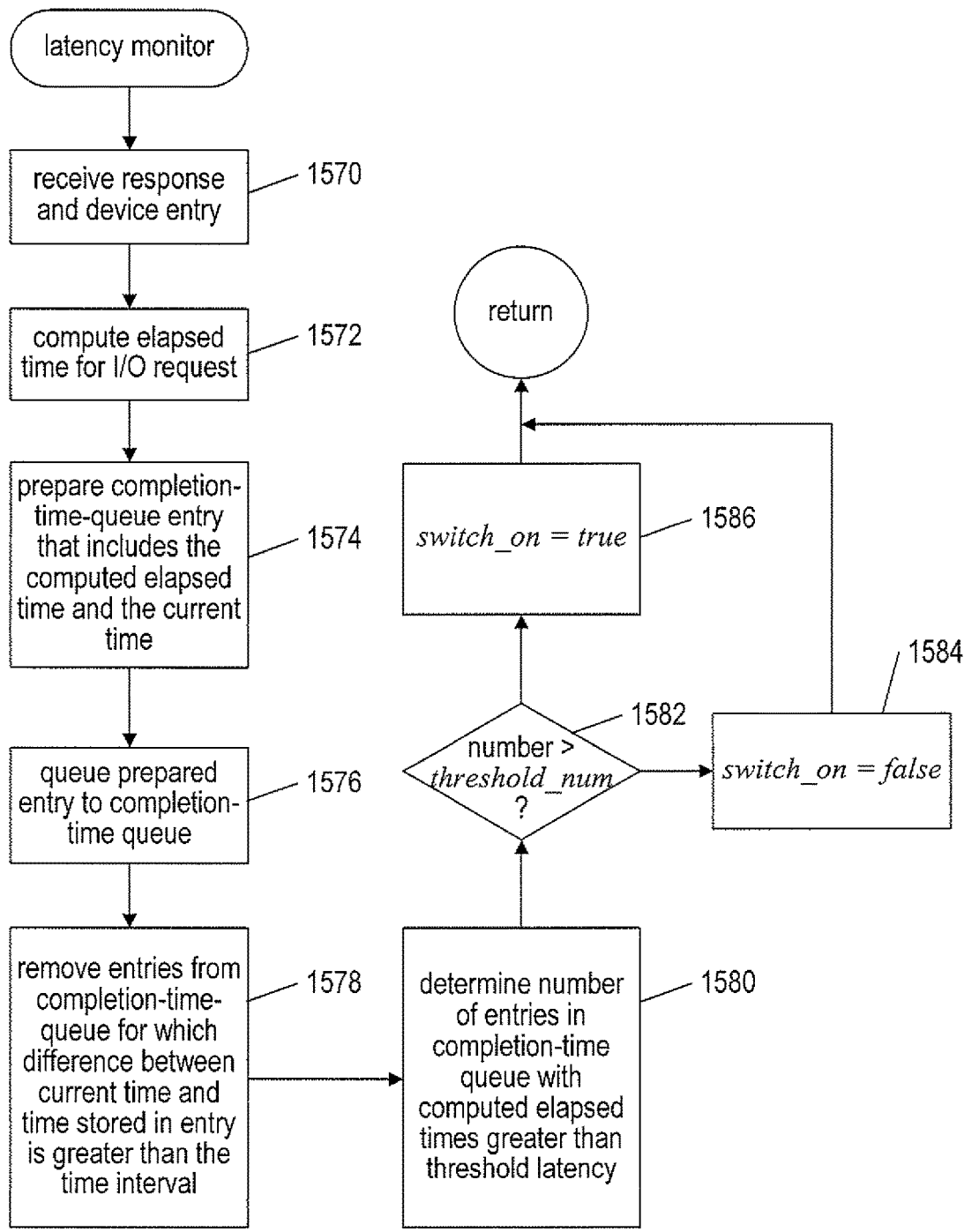

FIG. 15F provides a control-flow diagram for the routine "latency monitor," called in step 1554 of FIG. 15E. In step 1570, the latency-monitor routine receives the response to the I/O request, or a reference to the response to the I/O request, and a devices-array entry corresponding to the device from which the response was received. In step 1572, the latency-monitor routine computes an elapsed time for execution of the request, equal to the result of subtracting the time associated with the corresponding I/O request, in the commands_in_progress queue, from the current system time. In step 1574, the latency-monitor routine prepares a completion_time-queue entry that includes, for the elapsed time value (1516*a* in FIG. 15B), the computed elapsed time and that includes, for the time value (1516*b* in FIG. 15B), the current system time. In step 1576, the latency-monitor routine queues the prepared completion_time-queue entry to the completion_time queue. In step 1578, the latency-monitor routine removes any entries in the completion_time queue with time values beyond the length of the time interval (1515*c* in FIG. 15B). In step 1578, the latency-monitor routine determines the number of entries in the completion_time queue with elapsed time values greater than the threshold_latency value for the device (1518*b* in FIG. 15B). When the number of entries in the completion_time queue with elapsed time values greater than the threshold_latency value is equal to, or exceeds, the threshold_num value (1518*c* in FIG. 15B), the switch_on value in the devices-array entry is set to FALSE, so that the short-circuit component does not operate in bypass mode. Otherwise, the switch_on value in the devices-array entry is set to TRUE, so that the short-circuit component operates in bypass mode. Much simpler latency monitoring may be implemented, in certain implementations, without using a completion_time queue. For example, an array can be used to represent short time-interval buckets within the time interval, each bucket including a number of I/O request executions with elapsed times that exceeded a threshold value. Even simpler implementations are possible. The latency monitor may undertake more complex analyses of whether or not the block later should be short-circuited for a particular device, including additional data that may be collected, over time, in alternative implementations.

Although the present invention has been described in terms of particular embodiments, it is not intended that the invention be limited to these embodiments. Modifications within the spirit of the invention will be apparent to those skilled in the art. For example, any of many different implementations of the short-circuit component with latency monitoring can be obtained by varying any of many different implementation and design parameters, including choice of hardware layer, virtualization layer, operating system, programming language, modular organization, data structures, control structures, and other such design and implementation parameters. The short-circuit component is inserted into the storage stack in such a way that it can intercept outgoing I/O requests directed to high-throughput device controllers and can receive notifications of incoming I/O-request responses from those high-throughput device controllers and can appropriately bypass I/O scheduling within the storage stack, when the short-circuit component is operating in bypass mode, and otherwise allow the native storage stack to operate in the expected fashion, when not operating in bypass mode. The details of interfacing of the short-circuit component within a storage stack are operating-system dependent, virtualization-layer dependent, and device-controller-type specific. In certain implementations, only a subset of I/O-request completions are monitored for device-latency determination, rather than all I/O-request completions.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A storage-stack subsystem within a computer system, the storage-stack subsystem comprising:
   high-level storage-stack components and interfaces, including a file system, to which applications, remote computational entities, and non-file-system portions of an operating-system direct I/O requests;
   one or more I/O-scheduling subcomponents that receive I/O-requests from one or more of the high-level storage-stack components and that direct the received I/O-requests to low-level storage-stack components;
   the low-level storage-stack components, including host interfaces to storage-device controllers; and
   a latency monitor and short-circuit switch that selectively routes I/O requests from one or more of the high-level storage-stack components to the low-level storage-stack components, bypassing the one or more I/O-scheduling subcomponents.

2. The storage-stack subsystem of claim 1 wherein the I/O-scheduling subcomponents receive the I/O-requests, queue the I/O-requests to internal request queues, re-sequence requests within groups of received requests, and carry out various methods for distributing I/O-requests among components of lower-level host interfaces to data-storage-device interfaces, incurring computational and I/O-request-execution latency overheads in order to achieve greater I/O-request-execution latency reduction.

3. The storage-stack subsystem of claim 1 wherein, upon receiving an I/O request, the short-circuit switch:
   determines a target data-storage device to which the I/O request is directed;
   determines whether the target data-storage device is a candidate for I/O-request routing directly to a lower-level storage-stack component associated with the target data-storage-device, thereby bypassing the one or more I/O-scheduling subcomponents;
   when an I/O-request-execution latency associated with the target device is less than a threshold latency and when the target data-storage device is a candidate for I/O-request routing directly to a lower-level storage-stack component,
      routes the I/O request directly to the lower-level storage-stack component associated with the target data-storage-device; and
   when the I/O-request-execution latency is greater than or equal to the threshold latency or when the target data-storage device is not a candidate for I/O-request routing directly to a lower-level storage-stack component,
      routes the I/O request to the one or more I/O scheduling components.

4. The storage-stack subsystem of claim 3 wherein the latency monitor and short-circuit switch maintains an I/O-request-execution latency for one or more of:
   each data-storage device to which I/O requests are routed by the latency monitor and short-circuit switch;
   each group of data-storage devices to which I/O requests are routed by the latency monitor and short-circuit switch; and all data-storage devices to which I/O requests are routed by the latency monitor and short-circuit switch.

5. The storage-stack subsystem of claim 3 wherein a target data-storage device is a candidate for I/O-request routing directly to a lower-level storage-stack component when the target data-storage is a high-throughput data-storage device for which I/O scheduling may not provide sufficient I/O-request-execution-latency reduction to offset computational overheads and I/O-request-execution latencies associated with I/O scheduling.

6. The storage-stack subsystem of claim 3 wherein the latency monitor and short-circuit switch monitors one of:
   execution of all I/O requests;
   execution of the I/O requests directed to each of one or more particular data-storage devices;
   execution of a portion of all I/O requests; and
   execution of a portion of the I/O requests directed to each of one or more particular data-storage devices.

7. The storage-stack subsystem of claim 3 wherein the latency monitor and short-circuit switch, upon receiving an interrupt or other notification that indicates that an I/O-request response is available for processing, process the I/O-request response by:
   computing an elapsed time for execution of the I/O request corresponding to the I/O-request response;
   using the computed elapsed time to update stored I/O-request-execution-latency information; and
   determining, from the I/O-request-execution-latency information, whether the I/O-request-execution-latency is below or greater than or equal to the threshold latency.

8. The storage-stack subsystem of claim 7 wherein the latency monitor and short-circuit switch first determine whether or not to update the I/O-request-execution-latency information using an elapsed time computed for the I/O-request response.

9. The storage-stack subsystem of claim 7 wherein the latency monitor and short-circuit switch determine, from the I/O-request-execution-latency information, whether the I/O-request-execution-latency is below or greater than or equal to the threshold latency by determining whether a threshold number of recent computed elapsed times are greater than or equal to a threshold elapsed time.

10. A method that increases I/O-request throughput of a storage-stack subsystem within a computer system, the storage-stack subsystem having high-level storage-stack components and interfaces, including a file system, to which applications, remote computational entities, and non-file-system portions of an operating-system direct I/O requests, one or more I/O-scheduling subcomponents that receive I/O-requests from one or more of the high-level storage-stack components and that direct the received I/O-requests to low-level storage-stack components, and the low-level storage-stack components, including host interfaces to storage-device controllers, the method comprising:
   introducing a latency monitor and short-circuit switch into the storage-stack subsystem; and
   selectively routing, by the latency monitor and short-circuit switch, I/O requests from one or more of the high-level storage-stack components to the low-level storage-stack components, bypassing the one or more I/O-scheduling subcomponents.

11. The method of claim 10 wherein the I/O-scheduling subcomponents receive the I/O-requests, queue the I/O-requests to internal request queues, re-sequence requests within groups of received requests, and carry out various methods for distributing I/O-requests among components of lower-level host interfaces to data-storage-device interfaces, incurring computational and I/O-request-execution latency overheads in order to achieve greater I/O-request-execution latency reduction.

12. The method of claim 10 further comprising, upon receiving an I/O request:
   determines a target data-storage device to which the I/O request is directed;
   determines whether the target data-storage device is a candidate for I/O-request routing directly to a lower-level storage-stack component associated with the target data-storage-device, thereby bypassing the one or more I/O-scheduling subcomponents;
   when an I/O-request-execution latency associated with the target device is less than a threshold latency and when the target data-storage device is a candidate for I/O-request routing directly to a lower-level storage-stack component,
      routes the I/O request directly to the lower-level storage-stack component associated with the target data-storage-device; and
   when the I/O-request-execution latency is greater than or equal to the threshold latency or when the target data-storage device is not a candidate for I/O-request routing directly to a lower-level storage-stack component,
      routes the I/O request to the one or more I/O scheduling components.

13. The method of claim 12 wherein the latency monitor and short-circuit switch maintains an I/O-request-execution latency for one or more of:
   each data-storage device to which I/O requests are routed by the latency monitor and short-circuit switch;
   each group of data-storage devices to which I/O requests are routed by the latency monitor and short-circuit switch; and
   all data-storage devices to which I/O requests are routed by the latency monitor and short-circuit switch.

14. The method of claim 12 wherein a target data-storage device is a candidate for I/O-request routing directly to a lower-level storage-stack component when the target data-storage is a high-throughput data-storage device for which I/O scheduling may not provide sufficient I/O-request-execution-latency reduction to offset computational overheads and I/O-request-execution latencies associated with I/O scheduling.

15. The method of claim 12 wherein the latency monitor and short-circuit switch monitors one of:
   execution of all I/O requests;
   execution of the I/O requests directed to each of one or more particular data-storage devices;
   execution of a portion of all I/O requests; and
   execution of a portion of the I/O requests directed to each of one or more particular data-storage devices.

16. The method of claim 12 further comprising, upon receiving an interrupt or other notification that indicates that an I/O-request response is available for processing:
   processing, by the latency monitor and short-circuit switch, the I/O-request response by
      computing an elapsed time for execution of the I/O request corresponding to the I/O-request response;
      using the computed elapsed time to update stored I/O-request-execution-latency information; and
      determining, from the I/O-request-execution-latency information, whether the I/O-request-execution-latency is below or greater than or equal to the threshold latency.

17. The method of claim 16 wherein the latency monitor and short-circuit switch first determine whether or not to update the I/O-request-execution-latency information using an elapsed time computed for the I/O-request response.

18. The method of claim 16 wherein the latency monitor and short-circuit switch determine, from the I/O-request-execution-latency information, whether the I/O-request-execution-latency is below or greater than or equal to the threshold latency by determining whether a threshold number of recent computed elapsed times are greater than or equal to a threshold elapsed time.

19. Computer instructions, stored within a data-storage device within a computer system that has a storage-stack subsystem, the storage-stack subsystem having high-level storage-stack components and interfaces, including a file system, to which applications, remote computational entities, and non-file-system portions of an operating-system direct I/O requests, one or more I/O-scheduling subcomponents that receive I/O-requests from one or more of the high-level storage-stack components and that direct the received I/O-requests to low-level storage-stack components, and the low-level storage-stack components, including host interfaces to storage-device controllers, when executed by one or more processors, control the computer system to:

introduce a latency monitor and short-circuit switch into the storage-stack subsystem; and selectively route, by the latency monitor and short-circuit switch, I/O requests from one or more of the high-level storage-stack components to the low-level storage-stack components, bypassing the one or more I/O-scheduling subcomponents.

20. The computer instructions of claim 19 wherein the computer instructions further control the latency monitor and short-circuit switch, upon receiving an I/O request, to:

determine a target data-storage device to which the I/O request is directed;

determine whether the target data-storage device is a candidate for I/O-request routing directly to a lower-level storage-stack component associated with the target data-storage-device, thereby bypassing the one or more I/O-scheduling subcomponents;

when an I/O-request-execution latency is less than a threshold value and when the target data-storage device is a candidate for I/O-request routing directly to a lower-level storage-stack component, route the I/O request directly to the lower-level storage-stack component associated with the target data-storage-device; and when the I/O-request-execution latency is greater than or equal to the threshold value or when the target data-storage device is not a candidate for I/O-request routing directly to a lower-level storage-stack component, route the I/O request to the one or more I/O scheduling components.

* * * * *